United States Patent
Ozasa et al.

(10) Patent No.: US 6,927,789 B2
(45) Date of Patent: Aug. 9, 2005

(54) PIXEL CLOCK GENERATING DEVICE, LASER SCANNING DEVICE, AND IMAGE FORMING DEVICE

(75) Inventors: Dan Ozasa, Tokyo (JP); Masaaki Ishida, Kanagawa (JP); Yasuhiro Nihei, Kanagawa (JP); Atsufumi Omori, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/409,143
(22) Filed: Apr. 9, 2003

(65) Prior Publication Data
US 2004/0032482 A1 Feb. 19, 2004

(30) Foreign Application Priority Data
Apr. 10, 2002 (JP) ........................................ 2002-108158

(51) Int. Cl.[7] ................................................ B41J 2/435
(52) U.S. Cl. ...................................................... 347/249
(58) Field of Search ................................. 347/229, 234,
347/235, 248–250, 252; 327/2, 3, 291,
231–236; 355/35; 359/216, 204; 358/474,
494

(56) References Cited
U.S. PATENT DOCUMENTS

| 4,872,065 | A | * | 10/1989 | Isono et al. ................... 358/494 |
|-----------|---|---|---------|------------------------------|
| 5,138,623 | A |   | 8/1992  | Ema et al. ................ 372/38.07 |
| 5,237,579 | A |   | 8/1993  | Ema et al. ..................... 372/31 |
| 5,258,780 | A |   | 11/1993 | Ema et al. ................... 347/131 |
| 5,671,069 | A | * | 9/1997  | Kodama ...................... 358/474 |
| 5,784,091 | A |   | 7/1998  | Ema et al. ................... 347/131 |
| 5,946,334 | A |   | 8/1999  | Ema et al. ............... 372/38.01 |
| 6,118,798 | A |   | 9/2000  | Ema et al. ............. 372/29.011 |
| 6,151,152 | A | * | 11/2000 | Neary ......................... 359/216 |
| 6,185,026 | B1 | * | 2/2001 | Hayashi et al. ............. 359/204 |
| 6,366,336 | B1 | * | 4/2002 | Kanno .......................... 355/35 |
| 6,498,617 | B1 |   | 12/2002 | Ishida et al. ................. 347/252 |
| 6,731,317 | B2 |   | 5/2004  | Ema et al. ................... 347/135 |

FOREIGN PATENT DOCUMENTS

| JP | 11-167081  | 6/1999 |
|----|------------|--------|
| JP | 2001-228415 | 8/2001 |

OTHER PUBLICATIONS

U.S. Appl. No. 10/095,913, filed Mar. 13, 2002, Ema et al.
U.S. Appl. No. 10/183,748, filed Jun. 28, 2002, Nihei et al, Pending.

(Continued)

*Primary Examiner*—Hai Pham
(74) *Attorney, Agent, or Firm*—Oblon, Spivak, McClelland, Maier & Neustadt, P.C.

(57) ABSTRACT

A pixel clock generating device includes a measurement unit that measures a scanning time required for scanning a length and outputs a measured value, a pixel clock generating unit that generates a pixel clock, and a reference clock generating unit that generates a reference clock having a frequency higher than the pixel clock. A phase of the pixel clock is controlled based on (i) the reference clock and (ii) a comparison result between the measured scanning time and a preset scanning time.

12 Claims, 26 Drawing Sheets

OTHER PUBLICATIONS

U.S. Appl. No. 10/214,559, filed Aug. 9, 2002, Ishida et al, pending.
U.S. Appl. No. 10/259,769, filed Sep. 30, 2002, Omori et al, Pending.
U.S. Appl. No. 10/323,837, filed Dec. 20, 2002, Suzuki et al, Pending.
U.S. Appl. No. 10/409,143, filed Apr. 9, 2003, Ozasa et al.
U.S. Appl. No. 10/409,143, filed Apr. 9, 2003, Ozasa et al.
U.S. Appl. No. 10/667,321, filed Sep. 23, 2003, Omori et al, Pending.
U.S. Appl. No. 10/409,143, filed Apr. 9, 2003, Ozasa et al.
U.S. Appl. No. 10/803,042, filed Mar. 18, 2004, Ishida et al.
U.S. Appl. No. 10/409,143, filed Apr. 9, 2003, Ozasa et al.
U.S. Appl. No. 10/854,268, filed May 27, 2004, Ishida et al.
U.S. Appl. No. 10/409,143, filed Apr. 9, 2003, Ozasa et al.
U.S. Appl. No. 11/030,419, filed Jan. 7, 2005, Nihei et al.
U.S. Appl. No. 10/409,143, filed Apr. 9, 2003, Ozasa et al.
U.S. Appl. No. 10/953,372, filed Sep. 30, 2004, Nihei et al.
U.S. Appl. No. 10/409,143, filed Apr. 9, 2003, Ozasa et al.
U.S. Appl. No. 10/942,073, filed Sep. 16, 2004, Ozasa et al.

* cited by examiner

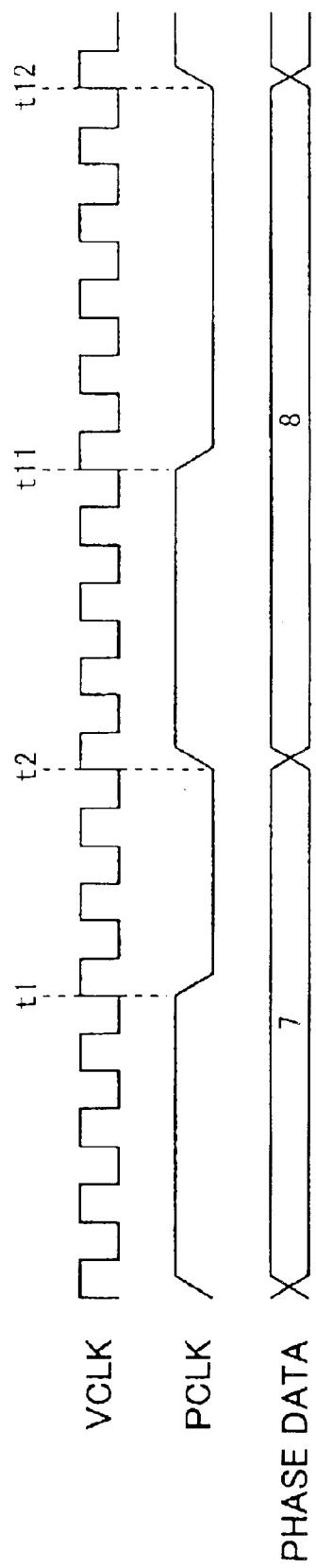

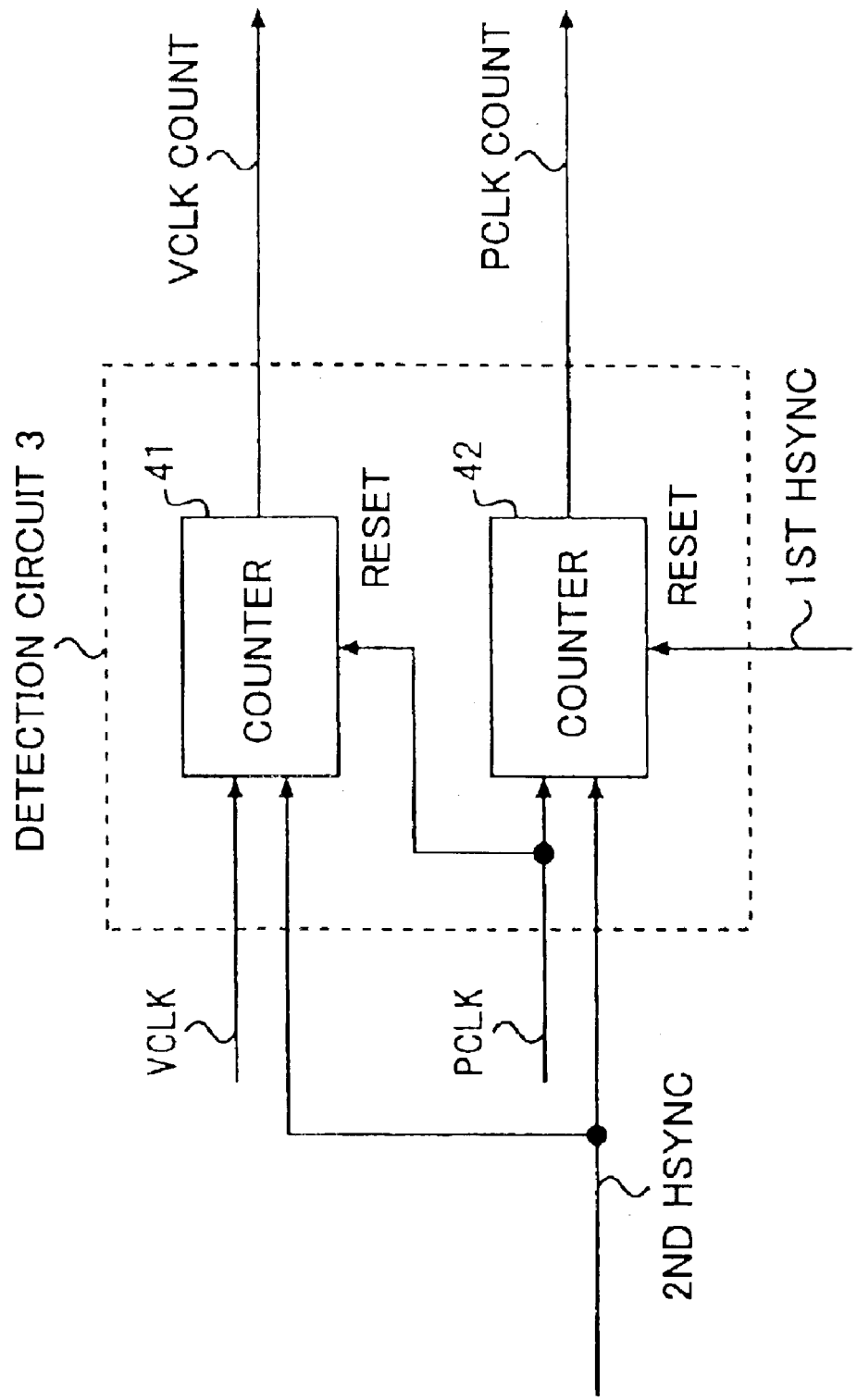

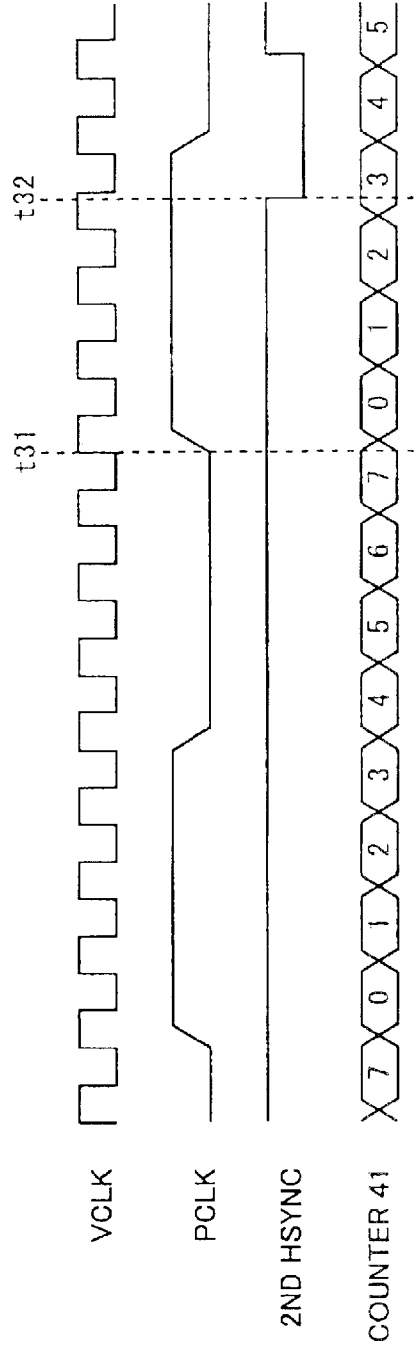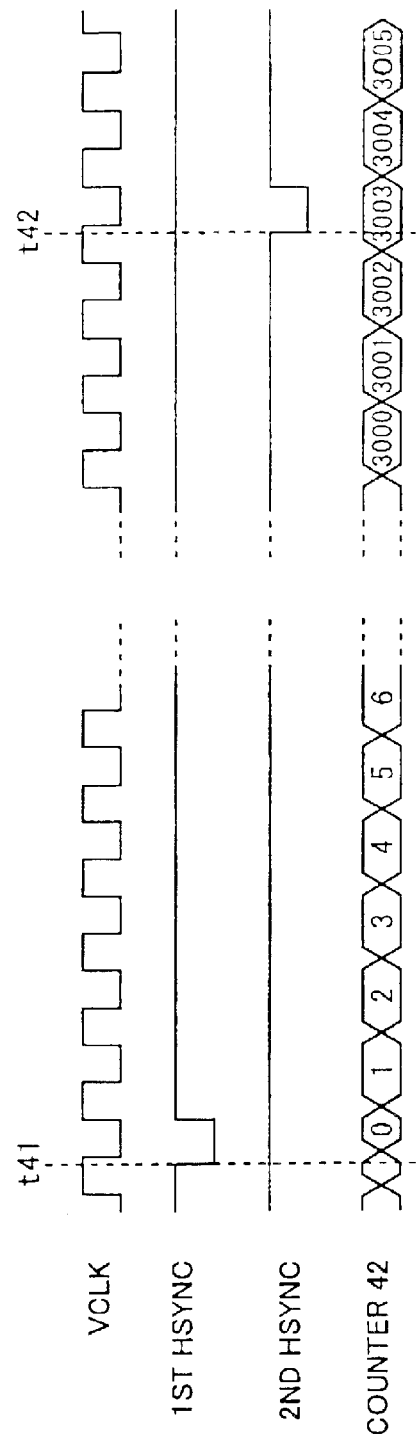

CORRECTION SIGNAL Se    PHASE DATA

1 PCLK

LIGHT SOURCE UNIT 400

LIGHT SOURCE UNIT 500

LIGHT SOURCE UNIT 600

PIXEL CLOCK GENERATING DEVICE, LASER SCANNING DEVICE, AND IMAGE FORMING DEVICE

BACKGROUND OF THE INVENTION

1. Field of the Invention

The present invention relates to a pixel clock generating device, a laser scanning device, and an image forming device.

2. Description of the Related Art

FIG. 25 shows a general configuration of an image forming device such as a laser printer, or a digital copy machine. As shown in FIG. 25, a laser beam emitted from a semiconductor laser unit 1009 is scanned by a rotational polygon mirror 1003, and is reflected to a photo conductor 1001 that functions as an object medium. The light spot of the laser beam on the photo conductor 1001 forms an electrostatic latent image there. Once the polygon mirror 1003 finishes the scanning of one line, it deflects the laser beam to irradiate a photo detector 1004. The photo detector 1004 converts the irradiated laser beam into electrical signals and inputs the signals to a PLL (Phase Locked Loop) circuit 1006. The PLL circuit generates a clock signal (called "pixel clock" or "image clock") for the next line after receiving the signals from the photo detector 1004. Further, a clock signal having a frequency higher than the pixel clock (hereinafter, referred to as "high frequency clock") is input to the PLL circuit 1006 from a clock generator 1005, thereby the phase of the pixel clock signal is synchronized.

The pixel clock signal generated in the PLL circuit 1006 is supplied to an image processing unit 1007 and a laser driving circuit 1008. The image processing unit 1007 inputs image data to the laser driving circuit 1008 according to the pixel clock, and the laser driving circuit 1008 drives the semiconductor laser unit 1009 on the basis of the pixel clock. Consequently, an electrostatic latent image corresponding to the input image data is formed on the photo conductor 1001.

As shown above, according to the pixel clock whose phase is adjusted in each line, the image forming device shown in FIG. 25 is able to control the latent image formation on the photo conductor 1001 by controlling the time of light emission of the semiconductor laser in the semiconductor laser unit 1009.

In a scanning optical system having the above configuration, a turnable deflector such as the polygon scanner is used. However, the distance between one reflection plane and the rotational axis of the deflector may change, as a result, there arises non-uniformity of the scanning speed of the laser beam (that is, the speed of the light spot moving on the medium during scanning), and causes image degradation. To meet the requirements of high image quality, the scanning non-uniformity should be eliminated.

On the other hand, when a multi-beam optical system is used as a light source, if the wave-lengths of individual lasers are somehow different, the irradiation positions of the laser beams on the medium may differ from each other. This causes different scanning lengths of individual lasers and therefore image degradation. To attain high image quality in such a case, it is also required to make corrections to the scanning length.

In the prior art, for example, the Japanese Unexamined Patent Publications (Kokai) No. 11-167081 and No. 2001-228415 disclose methods for controlling the light spot positions along a scanning line by changing the frequency of the pixel clock.

There is also a well-known method as illustrated in FIG. 26, in which the number of clocks is counted in a period associated with the scanning from a photo detector A 1107 to a photo detector B 1108 situated at the two ends of the photo conductor 1105, respectively, to detect the scanning speed, and thereby to control the rotational speed of the polygon mirror 1104.

In the above related art involving changing the frequency of the pixel clock (it is the so-called "Frequency Modulation"), however, the configuration of the control unit for the pixel clock becomes complicated, and becomes more complicated if the frequency modulation width becomes smaller. Therefore, this technique is not suitable to delicate control.

The above non-uniformity in scanning can be ascribed to the rotational jitter of the deflector, and expansion and contraction of the scanning lens 1002 when the temperature changes. Thus, it is difficult to eliminate the scanning non-uniformity even when the same reflection plane of the deflector is used to reflect the laser beam, because there is a limitation to the precision of controlling the rotational motor of the deflector.

SUMMARY OF THE INVENTION

Accordingly, it is a general object of the present invention to solve the above problems of the related art.

A more specific object of the present invention is to provide a pixel clock generating device able to control a phase of a pixel clock with high precision but a simple configuration, and to correct fluctuation of scanning length with high precision.

Another object of the present invention is to provide a laser scanning device and an image forming device including the above pixel clock generating device.

To attain the above objects, according to a first aspect of the present invention, there is provided a pixel clock generating device comprising a measurement unit configured to measure a scanning time required for scanning a length and outputting a measured value, a pixel clock generating unit configured to generate a pixel clock, and a reference clock generating unit configured to generate a reference clock having a frequency higher than the pixel clock, wherein duration of a level of the pixel clock is controlled based on the reference clock and a comparison result between the measured scanning time and an object scanning time.

According to the above invention, an object scanning time is set beforehand, and a correction is made based on the comparison result of the object scanning time and the measured scanning time. Therefore, it becomes possible to correct with high precision the fluctuation of the scanning length due to the difference of the reflection planes of the polygon mirror and due to the change with time of the rotational condition of the polygon mirror. Furthermore, the present invention is able to control the width of the pixel clock based on the signal width decided by the high frequency clock (this process is also referred to as "phase control"). Accordingly, it is possible to perform phase control for the pixel clock with high precision but a simple configuration, and therefore to correct the fluctuation of the scanning length with high precision.

Preferably, the above pixel clock generating device further comprises a comparison result outputting unit configured to compare the measured scanning time and the object scanning time and outputting a difference between the measured scanning time and the object scanning time as said comparison result, and a phase data generating unit configured to generate phase data used for controlling the duration of a level of the pixel clock based on the comparison result, wherein the pixel clock generating unit generates the pixel clock based on the phase data.

According to the above invention, it becomes possible to generate phase data to eliminate the difference between the object scanning time and the measured scanning time.

Preferably, in the above pixel clock generating device, the pixel clock generating unit generates the pixel clock with its phase being synchronized in different lines based on a first horizontal synchronization signal.

According to the above invention, it becomes possible to make the write positions in different lines uniform.

Preferably, in the above pixel clock generating device, the measurement unit obtains the measured scanning time by counting the reference clock or the pixel clock, and the comparison result outputting unit outputs the comparison result using the count of the reference clock or the count of the pixel clock.

According to the above invention, it becomes possible to compare the object scanning time and the measured scanning time and determine the correction value in units of the pixel clock and the high frequency clock.

Preferably, the above pixel clock generating device further comprises a conversion unit configured to convert the count of the pixel clock obtained in the measurement unit to the count of the reference clock, and wherein the comparison result outputting unit outputs said comparison result using the count of the reference clock.

According to the above invention, it becomes possible to determine the correction value based on the high frequency clock that defines the minimum unit.

Preferably, in the above pixel clock generating device, the measurement unit includes a first counting unit configured to count the measured scanning time based on the pixel clock and a second counting unit configured to count a fractional part not counted by the first counting unit based on the reference clock.

According to the above invention, it becomes possible to use counters or similar configuration to count the pixel clock and the high frequency clock and to make comparison and correction by using digital values.

Preferably, in the above pixel clock generating device, the second counting unit counts once in each period of the reference clock.

According to the above invention, it becomes possible to determine the correction value based on the high frequency clock that defines the minimum unit.

Preferably, in the above pixel clock generating device, the object value of the count of the reference clock and the object value of the count of the pixel clock are set individually, and the comparison result outputting unit obtains the comparison result by comparing the count of the reference clock obtained in the measurement unit with its object value and by comparing the count of the pixel clock with its object value, respectively.

According to the above invention, it becomes possible to easily make the comparison between the measured scanning time and the object scanning time when the scanning time is measured by using both the pixel clock and the high frequency clock.

Preferably, in the above pixel clock generating device, the object value is set by using the count of the reference clock, and the comparison result outputting unit obtains the comparison result by comparing the count of the reference clock obtained in the conversion unit with the object value thereof.

According to the above invention, even when the scanning time is measured by using both the pixel clock and the high frequency clock, it becomes possible to make the comparison between the measured value and the object value, and to easily generate the phase data by using the thus obtained comparison result.

Preferably, in the above pixel clock generating device, the phase data generating unit comprises a correction value creation unit configured to create a correction value to be provided for the pixel clock based on the comparison result, and a phase data creation unit configured to create the phase data based on the sum of a plurality of said correction values created by the correction value creation unit.

According to the above invention, it becomes possible to determine the correction value based on the difference obtained from the comparison between the measured scanning time and the object scanning time, and to generate the phase data on the basis of the correction value.

Preferably, in the above pixel clock generating device, the correction value creation unit includes a comparison result storage unit for storing the comparison result, and the correction value creation unit creates a correction value based on the stored comparison result.

According to the above invention, it becomes possible to appropriately correct the fluctuation of the scanning length caused by changes with time.

Preferably, in the above pixel clock generating device, the correction value creation unit includes an integrator.

According to the above invention, it becomes possible to store changes with time by a simple configuration.

Preferably, in the above pixel clock generating device, the phase data generating unit generates the phase data based on the correction value for shifting the duration of a level of the pixel clock associated with a pixel at a position in an image forming region.

According to the above invention, by changing the width of the pixel clock by a desired amount, it becomes possible to make the scanning lengths of different lines equal while limiting the influence to the image to a low level.

Preferably, in the above pixel clock generating device, the phase data generating unit generates the phase data by distributing the correction value at equal intervals in each portion of the pixel clock related with one line.

According to the above invention, by distributing the correction value in the pixel clock, it becomes possible to make the scanning lengths of different lines equal while limiting the influence to the image to a low level.

Preferably, in the above pixel clock generating device, the phase data generating unit generates the phase data by distributing the correction value based on scanning speed in the image forming region.

According to the above invention, by changing the width of the pixel clock according to the characteristics of the optical configuration, it becomes possible to make the scanning lengths of different lines equal and to make corrections to the main scanning dot positions in an image at the same time.

Preferably, in the above pixel clock generating device, the pixel clock generating unit comprises a third counting unit configured to count the reference clock, a comparison unit configured to compare the count of the third counting unit with the phase data, and a pixel clock control unit configured to change states of the pixel clock based on a result of the comparison unit.

According to the above invention, it becomes possible to perform phase control for the pixel clock at small steps by using a relatively simple configuration in which the high frequency clock is not used.

To attain the above object, according to a second aspect of the present invention, there is provided a laser scanning device configured to output a laser beam for scanning a medium by driving a light source based on a pixel clock comprising a pixel clock generating device, a deflector for swinging an optical axis of the laser beam to a predetermined direction, and a first sensor and a second sensor provided at two positions separated by a preset distance in a region where the optical axis is swung by the deflector, wherein the pixel clock generating device comprises a measurement unit configured to measure a scanning time required for scanning the distance and outputting a measured value, a pixel clock generating unit configured to generate a pixel clock, a reference clock generating unit configured to generate a reference clock having a frequency higher than the pixel clock, wherein duration of a level of the pixel clock is controlled based on the reference clock and a comparison result between the measured scanning time and an object scanning time, and said measurement unit measures time intervals between a first horizontal synchronization signal output by the first sensor and a second horizontal synchronization signal output by the second sensor and outputting the measured value.

According to the above invention, it becomes possible to provide a laser scanning device having a single light source and including the above pixel clock generating device.

To attain the above object, according to a third aspect of the present invention, there is provided a laser scanning device configured to output a plurality of laser beams for scanning a medium by driving a plurality of light sources based on a pixel clock, comprising a pixel clock generating device, a deflector for swinging a plurality of optical axes of the laser beams to predetermined directions, respectively, and a first sensor and a second sensor provided at two positions separated by a preset distance in a region where the optical axes are swung by the deflector, wherein the pixel clock generating device comprises a measurement unit configured to measure a scanning time required for scanning the distance and outputting a measured value, a pixel clock generating unit configured to generate a pixel clock, a reference clock generating unit configured to generate a reference clock having a frequency higher than the pixel clock, wherein duration of a level of the pixel clock is controlled based on the reference clock and a comparison result between the measured scanning time and an object scanning time, and said measurement unit measuring time intervals between a first horizontal synchronization signal output by the first sensor and a second horizontal synchronization signal output by the second sensor and outputting the measured value.

According to the above invention, it becomes possible to provide a laser scanning device having a plurality of light sources and including the above pixel clock generating device.

Preferably, in the above laser scanning device, the light sources are arranged symmetrically and rotatably with a rotational axis as the center, and each of the optical axes is at an angle with the rotational axis so that the optical axes intersect with each other in a reflection plane of the deflector.

According to the above invention, it becomes possible to provide a laser scanning device able to scan a plurality of lines at one time.

To attain the above object, according to a fourth aspect of the present invention, there is provided an image forming device for forming an image by scanning a medium with a laser scanning device having at least one light source driven based on a pixel clock, said laser scanning device comprising a pixel clock generating device, a deflector for swinging at least one optical axis of at least one laser beam to a predetermined direction, and a first sensor and a second sensor provided at two positions separated by a preset distance in a region where the optical axis is swung by the deflector, wherein the pixel clock generating device comprises a measurement unit configured to measuring a scanning time required for scanning the distance and outputting a measured value, a pixel clock generating unit configured to generate a pixel clock, a reference clock generating unit configured to generate a reference clock having a frequency higher than the pixel clock, wherein duration of a level of the pixel clock is controlled based on the reference clock and a comparison result between the measured scanning time and an object scanning time, and said measurement unit measuring time intervals between a first horizontal synchronization signal output by the first sensor and a second horizontal synchronization signal output by the second sensor and outputting the measured value.

According to the above invention, it becomes possible to provide an image forming device including the above laser scanning device.

These and other objects, features, and advantages of the present invention will become more apparent from the following detailed description of preferred embodiments given with reference to the accompanying drawings.

BRIEF DESCRIPTION OF THE DRAWINGS

FIG. 4A shows operation when the phase data is "7", FIG. 4B shows operation when the phase data is "8", and FIG. 4C shows operation when the phase data is "6";

FIG. 5 is a time chart showing operation of the pixel clock generating circuit 6 which is configured to provide a phase data for each pixel clock pulse in the pixel clock generator 111;

FIG. 6 is a block diagram showing a configuration of the detection circuit 3;

FIGS. 7A and 7B are time charts showing operation of the detection circuit 3, where FIG. 7A shows operation of the counter 41, and FIG. 7B shows operation of the counter 42;

FIGS. 11A through 11C are views showing examples of the phase data output from the phase data generator 72;

DESCRIPTION OF THE PREFERRED EMBODIMENTS

[Principle]

Before detailed explanations, the principle of the present invention will be described at first.

As shown above, the present invention relates to a device able to correct the fluctuation of the scanning length with high precision. In the present invention, an ideal scanning time (an object value) is set as the time required to scan a preset distance, and by comparing the actual scanning time with the object value and determining their difference, it is possible to determine whether the scanning length (or scanning speed) associated with one line or one dot is longer or shorter (or faster or slower) than the object value. Further, the scanning length can be corrected to be uniform according to the comparison results.

Since the actual scanning length of each line is determined by the pixel clock (denoted as PCLK), for example, the actual scanning length is related to the duration of the high level or low level state of the pixel clock. Therefore, it is possible to make the scanning lengths of different lines uniform by appropriately controlling the level state of the pixel clock.

In order to realize such a device, for example, in the present invention, there is counted a number of pulses of a reference clock signal in a duration when a certain distance is actually scanned, and this count related to actual scanning is compared with a preset object value. Based on the comparison results, for example, the difference of the two counts, the timing of changing the level (High or Low) of the pulses of the pixel clock to adjust the actual scanning time of the next line, and hence the scanning length of the next line to maintain the scanning length a constant.

In description of this specification, the timing of changing the level of the pixel clock is referred to as "timing of transition", control of the duration of a level of the pixel clock is referred to as "phase control of the pixel clock", and data for this control is referred to as "phase data".

In addition, in the present invention, a configuration for generating a high frequency clock is provided and the high frequency clock is used as the reference clock. Being synchronized with the high frequency clock, the pixel clock is generated whose level changes at the above timing of transition. In this way, in the present invention, the scanning length is adjusted when necessary by comparing the measured scanning time (scanning speed) and the object one, and changing the level of the pixel clock based on the comparison result. As a result, it is possible to eliminate the fluctuation of the scanning length.

Below, preferred embodiments of the present invention will be explained with reference to the accompanying drawings.

The First Embodiment

Figure 1:
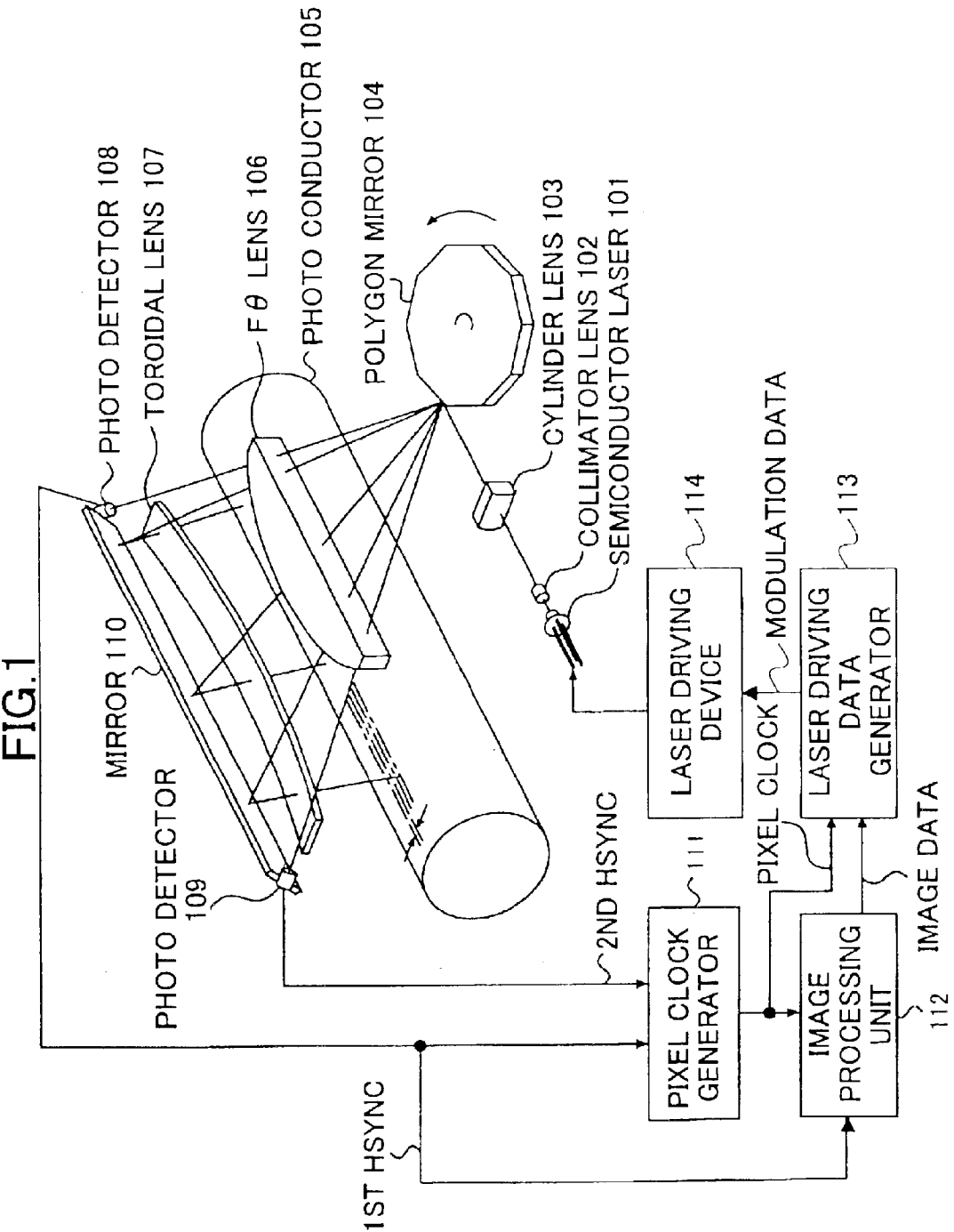
FIG. 1 is a view of a configuration of an image forming device 100 according to a first embodiment of the present invention.

FIG. 1 is a view of a configuration of an image forming device according to a first embodiment of the present invention.

Referring to FIG. 1, the image forming device 100 comprises a semiconductor laser 101 that is driven by a laser driving device 114 to emit a laser beam having any time spread. The laser beam from the semiconductor laser 101 is shaped by a collimator 102 and a cylinder lens 103, and is emitted to a polygon mirror 104 that is a prism having a regular polygonal base and has a rotational axis perpendicularly passing through the center of the base, and is reflected to scan the photo conductor 105 periodically. Before the reflected laser beam is applied to the photo conductor 105, its optical axis is bent after passing an fθ lens 106, a mirror 110 and a toroidal lens 107.

The laser beam is reflected to the photo conductor 105 and forms a light spot, thereby forming an electrostatic latent image on the photo conductor 101 in response to the output of the semiconductor laser 101.

Two photo detectors 108 and 109 are placed at two ends of the mirror 110 to detect the starting and finishing of the scanning. Specifically, the laser beam reflected to a certain direction by the polygon mirror 104 is incident on the photo detector 108 at the starting side before scanning one line on the photo conductor 105, and is incident on the photo detector 109 after the whole line is scanned. The photo detectors 108 and 109 convert the incident laser beam into electric signals, and these signals are input to a pixel clock generator 111. So, the starting time and finishing time of each one-line scanning are input to the pixel clock generator 111.

In the pixel clock generator 111, the time interval between the two signals input from the photo detectors 108 and 109 is measured, and the measured time interval is compared with a preset reference time or an object time, and thereby the deviation of the scanning time in each line is obtained. In addition, the pixel clock generator 111 generates phase data for correcting the measured deviation, and generates a pixel clock based on the phase data, which determines the timing when driving the semiconductor laser 101. The generated pixel clock is supplied to the laser driving data generator 113.

In the following explanations, the signal input from the photo detector 108 on the starting side is referred to as the first horizontal synchronization signal (1st HSYNC), and the signal input from the photo detector 109 is referred to as the second horizontal synchronization signal (2nd HSYNC). The first horizontal synchronization signal is supplied to the image processing unit 112 as a line synchronization signal.

The image processing unit 112 generates image data with the pixel clock as a reference, and inputs the data to the laser driving data generator 113. The laser driving data generator 113 generates laser driving data (modulation data) from the image data with the pixel clock as a reference, and inputs the laser driving data to the laser driving device 114. The laser driving device 114 drives the semiconductor laser 101 in response to the laser driving data. Thus, it is possible to generate images on the photo conductor 105 without fluctuation of the scanning length.

Pixel Clock Generator 111

Below, detailed explanation is made of the pixel clock generator 111 in the image forming device 100 with reference to figures.

Figure 2:
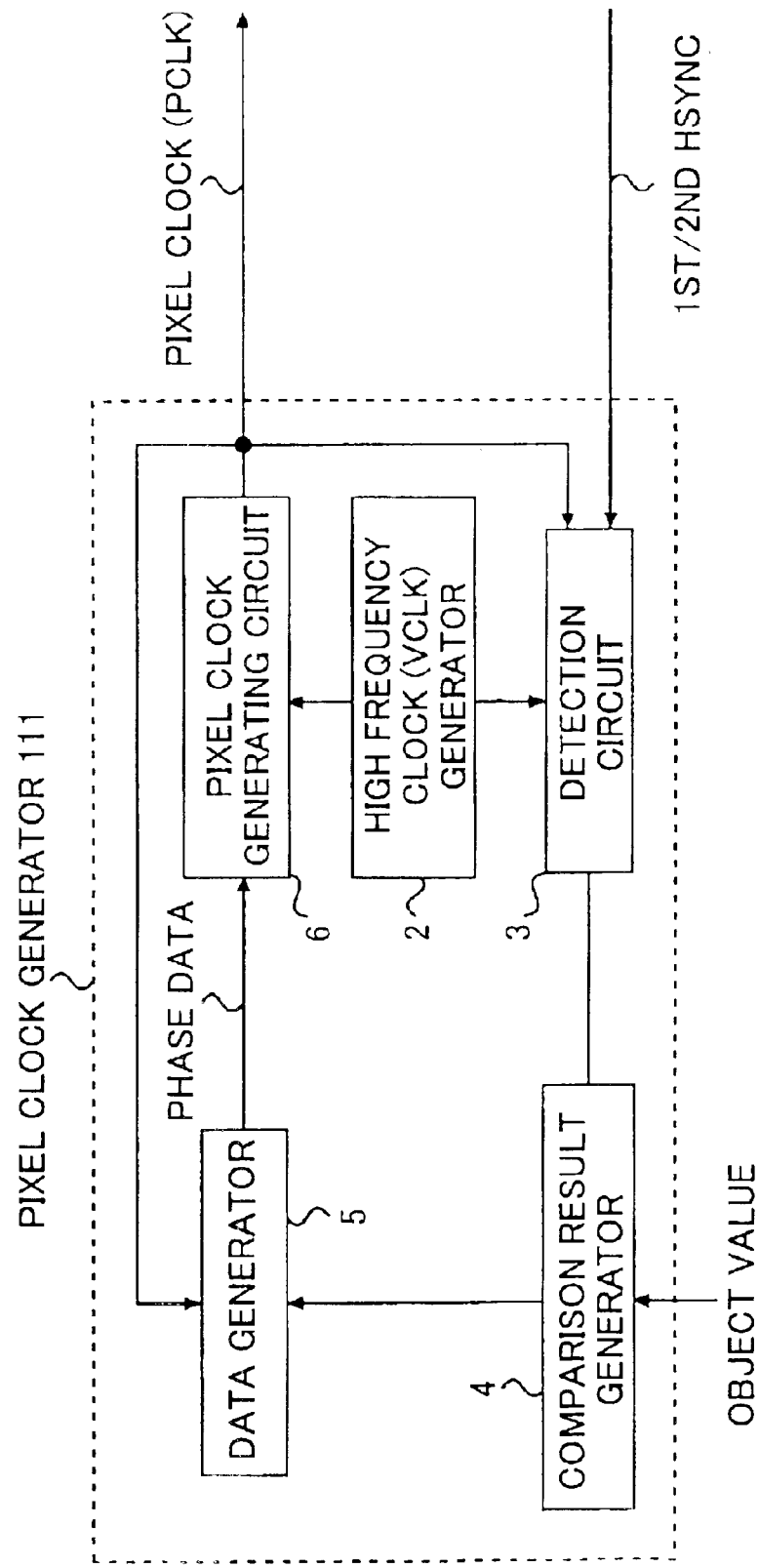
FIG. 2 is a block diagram showing a configuration of a pixel clock generator 111 in the image forming device 100.

FIG. 2 is a block diagram showing a configuration of the pixel clock generator 111 in the image forming device 100.

Referring to FIG. 2, the pixel clock generator 111 comprises a high frequency clock generator 2, a detection circuit 3, a comparison result generator 4, a data generator 5, and a pixel clock generating circuit 6.

In the pixel clock generator 111, the high frequency clock generator 2 generates a high frequency clock (denoted as VCLK) that functions as a reference signal, and inputs the high frequency clock to the pixel clock generating circuit 6 and the detection circuit 3. On the basis of the high frequency clock or the pixel clock, the detection circuit 3 counts the time interval from the time when the first horizontal synchronization signal is input to the time when the second horizontal synchronization signal is input, and outputs the count to the comparison result generator 4. The comparison result generator 4 calculates the difference between the count input from the detection circuit 3 and an object value input from the outside or set in advance, and outputs the result to the data generator 5. The data generator 5 generates phase data on the basis of the comparison result from the comparison result generator 4, and outputs the phase data to the pixel clock generating circuit 6. Based on the phase data and the high frequency clock, the pixel clock generating circuit 6 generates a pixel clock whose phase has been synchronized. Note that the phase data are used to determine the time length of the pixel clock, that is, the duration of a level state of the pixel clock. Accordingly, in the present embodiment, by changing the value of the phase data, the time length of the laser beam output from the semiconductor laser 191 is changed, and the scanning length on the photo conductor 105 is corrected. In the following explanations, however, the high frequency clock used as a unit for changing the time length of the pixel clock is varied according to the phase data.

Pixel Clock Generating Circuit 6

Below, detailed explanation is made of the pixel clock generating circuit 6 shown in FIG. 2 with reference to FIG. 3 through 5.

Figure 3:
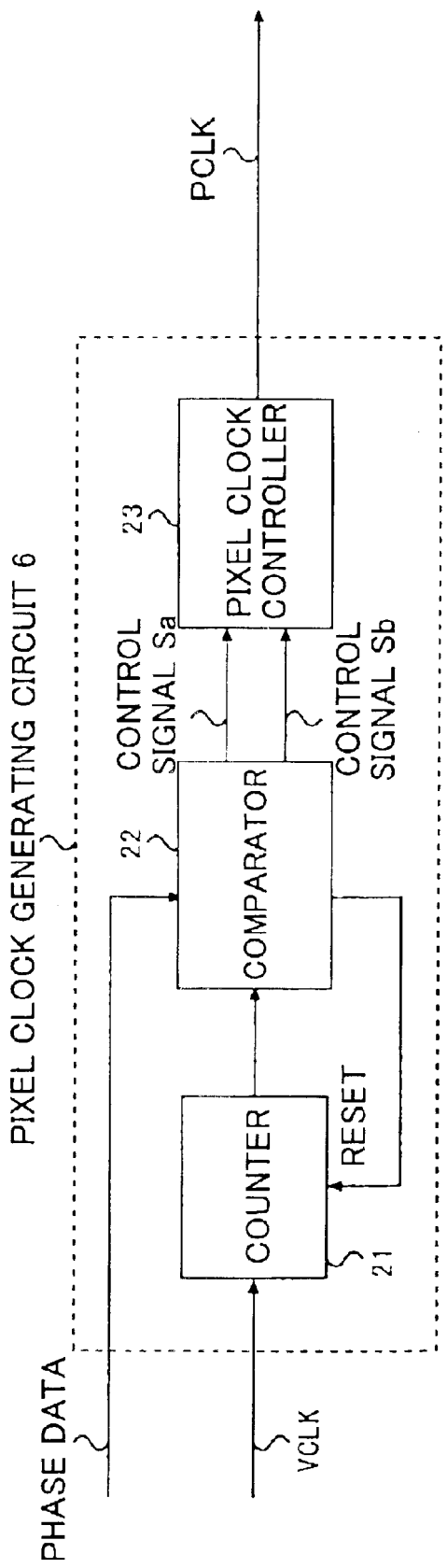
FIG. 3 is a block diagram showing a configuration of a pixel clock generating circuit 6 in the pixel clock generator 111.

Referring to FIG. 3, the pixel clock generating circuit 6 comprises a counter 21, a comparator 22, and a pixel clock controller 23.

In the pixel clock generating circuit 6, the counter 21 starts to operate at the rising time of the high frequency clock to count the number of pulses in the high frequency clock. The comparator 22 compares the count in the counter 21 with a preset value (setting value), and outputs a control signal Sa based on the comparison result. Similarly, the comparator 22 compares the count in the counter 21 with phase data indicating a phase shift acting as the timing of transition of the pixel clock, and outputs a control signal Sb based on the comparison result. The pixel clock controller 23 controls the timing of transition of the pixel clock based on the control signal Sa and control signal Sb.

Figure 4A:
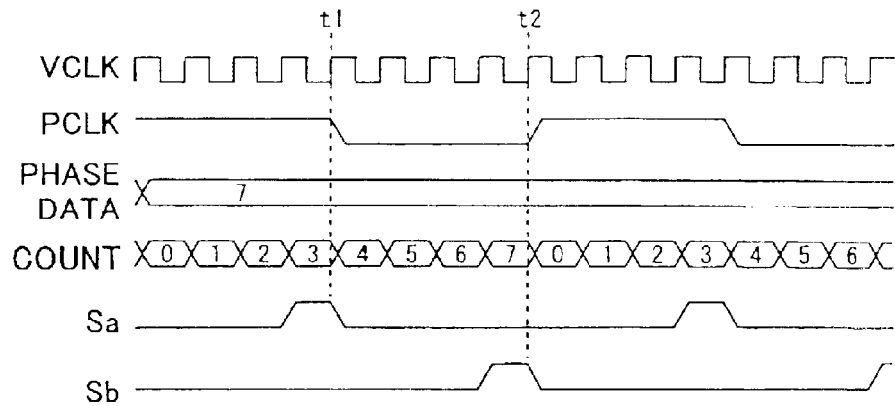
FIGS. 4A through 4C are time charts showing operation of the pixel clock generating circuit 6, where
Figure 4B:
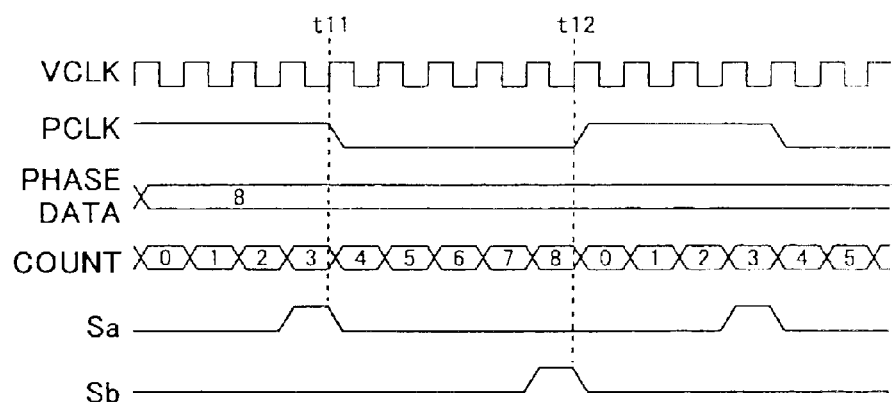
Figure 4C:
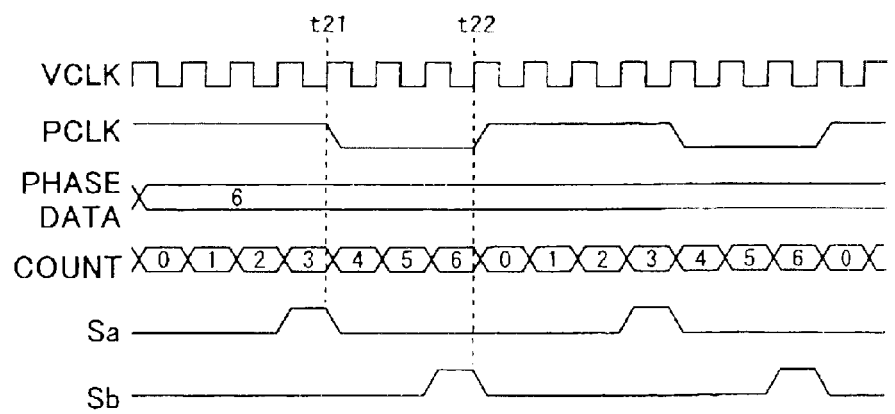

FIGS. 4A through 4C are time charts showing operation of the pixel clock generating circuit 6 shown in FIG. 3.

In the present embodiment, the pixel clock is assumed to be obtained by dividing the frequency of the high frequency clock by eight, and the duty of the pixel clock is 50% under a standard condition (that is, no correction is made). FIG. 4A shows a state transition when generating a standard pixel clock having a duty of 50% and an eight-divided frequency of the high frequency clock, FIG. 4B shows a state transition when generating a pixel clock by delaying the phase of a clock equivalent to one-eighth frequency division of the high frequency clock by one-eighth clock, and FIG. 4C shows a state transition when generating a pixel clock by setting earlier a clock equivalent to one-eighth frequency division of the high frequency clock by one-eighth clock.

In FIG. 4A, the phase data is set to be "seven". The phase data "seven" is a value indicating no correction to the scanning length, so the duty of the pixel clock is 50% as mentioned above.

In the comparator 22, a value of "three" is set in advance. Under these conditions, the counter 21 starts to operate at a rising time of the high frequency clock to count the number of pulses in the high frequency clock, and outputs the count to the comparator 22. The comparator 22 outputs a control signal Sa at the time t1 when the count of the counter 21 becomes "three". When the control signal Sa is at a high level and at a rising time of the high frequency clock related to t1, the pixel clock controller 23 changes the pixel clock from a high level to a low level.

Next, the comparator 22 compares the input phase data (it is seven in the present example) with the count, and outputs a control signal Sb when they are equal. In FIG. 4A, the comparator 22 outputs the control signal Sb at the time t2 when the count of the counter 21 becomes "seven". When the control signal Sb is at a high level and at a rising time of the high frequency clock related to t2, the pixel clock controller 23 changes the pixel clock from the low level to the high level. At the same time, the comparator 22 resets the counter 21, so the counter 21 starts to count from zero again.

By operation in the above way, as shown in FIG. 4A, it is possible to generate a pixel clock having a duty of 50% and an eight-divided frequency of the high frequency clock. The duty ratio of the pixel clock can be changed by changing the setting value of the comparator 22 (it is three in the present example), and/or by changing the frequency division ratio, and hence can be set to any value.

In FIG. 4B, the phase data is set to be "eight", and in the comparator 22, a value of "three" is set in advance. The phase data "eight" is a value indicating a necessity of a correction of lengthening the scanning length to a desired value.

Under these conditions, the counter 21 starts to operate at a rising time of the high frequency clock to count the number of the pulses in the high frequency clock, and outputs the count to the comparator 22. The comparator 22 outputs a control signal Sa at the time t11 when the count of the counter 21 becomes "three". When the control signal Sa is at a high level and at a rising time of the high frequency clock related to t11, the pixel clock controller 23 changes the pixel clock from the high level to the low level.

Next, the comparator 22 compares the input phase data (it is eight in the present example) with the count, and outputs the control signal Sb when they are equal. In FIG. 4B, the comparator 22 outputs the control signal Sb at the time t12 when the count of the counter 21 becomes "eight". When the control signal Sb is at a high level and at a rising time of the high frequency clock related to t12, the pixel clock controller 23 changes the pixel clock from the low level to the high level. At the same time, the comparator 22 resets the counter 21, so the counter 21 starts to count from zero again.

By operation in the above way, as shown in FIG. 4B, it is possible to generate a pixel clock by delaying the phase of a clock equivalent to one-eighth frequency division of the high frequency clock by one-eighth clock. When it is necessary to lengthen the scanning length more, it is enough to set a larger phase value.

In FIG. 4C, the phase data is set to be "six", and in the comparator 22, a value of "three" is set in advance. The phase data "six" is a value indicating a necessity of a correction of shortening the scanning length to a desired value.

Under these conditions, the counter 21 starts to operate at a rising time of the high frequency clock to count the number of the pulses in the high frequency clock, and outputs the count to the comparator 22. The comparator 22 outputs a control signal Sa at the time t21 when the count of the counter 21 becomes "three". When the control signal Sa is at a high level and at a rising time of the high frequency clock related to t21, the pixel clock controller 23 changes the pixel clock from the high level to the low level.

Next, the comparator 22 compares the input phase data (it is six in the present example) with the count, and outputs the control signal Sb when they are equal. In FIG. 4C, the comparator 22 outputs the control signal Sb at the time t22 when the count of the counter 21 becomes "six". When the control signal Sb is at a high level and at a rising time of the high frequency clock related to t22, the pixel clock controller 23 changes the pixel clock from the low level to the high level. At the same time, the comparator 22 resets the counter 21, so the counter 21 starts to count from zero again.

By operation in the above way, as shown in FIG. 4C, it is possible to generate a pixel clock by setting earlier the phase of a clock equivalent to one-eighth frequency division of the high frequency clock by one-eighth clock. When it is necessary to shorten the scanning length more, it is enough to set a smaller phase value.

Further, as shown in FIG. 2, by inputting the image data to the data generator 5, it is possible to send the image data to supply pixel clock generating circuit 6 in synchronization with a rising time of the pixel clock. As a result, it is possible to change the phase of the pixel clock one clock by one clock. FIG. 5 is a time chart showing operation of the pixel clock generating circuit 6 configured in such a way.

The pixel clock generated in the above way in the pixel clock generating circuit 6 is input to the image processing unit 112 and laser driving data generator 113.

Detection Circuit 3

Below, a detailed explanation is made of the detection circuit 3 shown in FIG. 2 with reference to FIG. 6 and FIG. 7.

Referring to FIG. 6, the detection circuit 3 comprises a counter 41 and a counter 42. The counter 41 starts to operate at the rising time of the high frequency clock to count the number of pulses in the high frequency clock, and is reset at the rising time of the pixel clock to count from zero again. Further, the counter 41 outputs the count at the time when the second horizontal synchronization signal (2nd HSYNC) is input as the count Xv of the high frequency clock.

The counter 42 starts to operate at the rising time of the pixel clock to count the number of pulses in the pixel clock, and is reset when the first horizontal synchronization signal (1st HSYNC) is input to count from zero again. Further, the counter 42 outputs the count at the time when the second horizontal synchronization signal (2nd SYNC) is input as the count Xp of the pixel clock.

By operating in this way, it is possible to obtain the count Xv of the high frequency clock and the count Xp of the pixel clock by counting the interval between the first horizontal synchronization signal and the second horizontal synchronization signal using a combination of the high frequency clock and the pixel clock. If the count Xp of the pixel clock is N, the actual number of the pixel clock existing in the interval between the first horizontal synchronization signal and the second horizontal synchronization signal is N−1. Thus, in order to compare the count Xp of the pixel clock with the object value, it is necessary to decrease the count Xp of the pixel clock by 1, alternatively, increase the count Xv of the high frequency clock equivalent to the object value by 1 when making the comparison.

FIGS. 7A and 7b are time charts showing operation of the detection circuit 3 shown in FIG. 6, where FIG. 7A shows operation of the counter 41, and FIG. 7B shows operation of the counter 42. In FIG. 7A, the counter 41 starts to operate at the rising time of the high frequency clock to count the number of pulses in the high frequency clock, and is reset at the rising time t31 of the pixel clock to count from zero again. Further, the counter 41 outputs the count at the falling time t32 of the second horizontal synchronization signal as the count Xv of the high frequency clock. In FIG. 7A, the count Xv of the high frequency clock is three.

In FIG. 7B, the counter 42 starts to operate at the rising time of the pixel clock to count the number of pulses in the pixel clock, and is reset at the falling time t41 of the first horizontal synchronization signal and start to count from zero again. Further, the counter 42 outputs the count at the falling time t42 of the second horizontal synchronization signal as the count Xp of the pixel clock. In FIG. 7B, the count Xp of the pixel clock is "3003".

By executing counting operations in this way, it is possible to measure the numbers of the high frequency clock and the pixel clock from the first horizontal synchronization signal to the second horizontal synchronization signal. The count Xv of the high frequency clock and the count Xp of the pixel clock are input to the comparison result generator 4 as the detection result.

Comparison Result Generator 4

Below, a detailed explanation is made of the configuration of the comparison result generator 4 shown in FIG. 2 with reference to FIG. 8 and FIG. 9.

Figure 8:
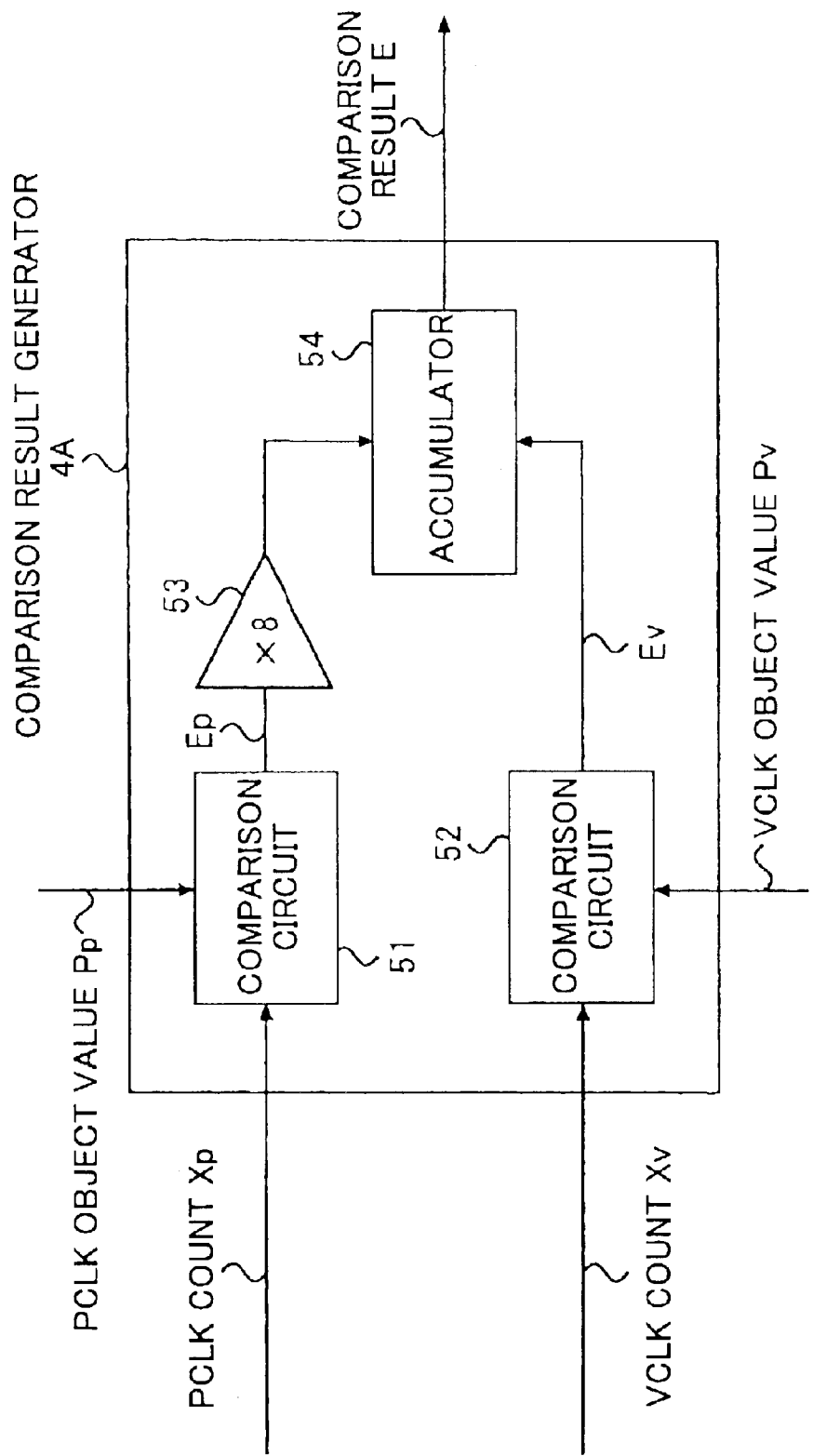
FIG. 8 is a block diagram showing an example of the configuration of the comparison result generator.
Figure 9:
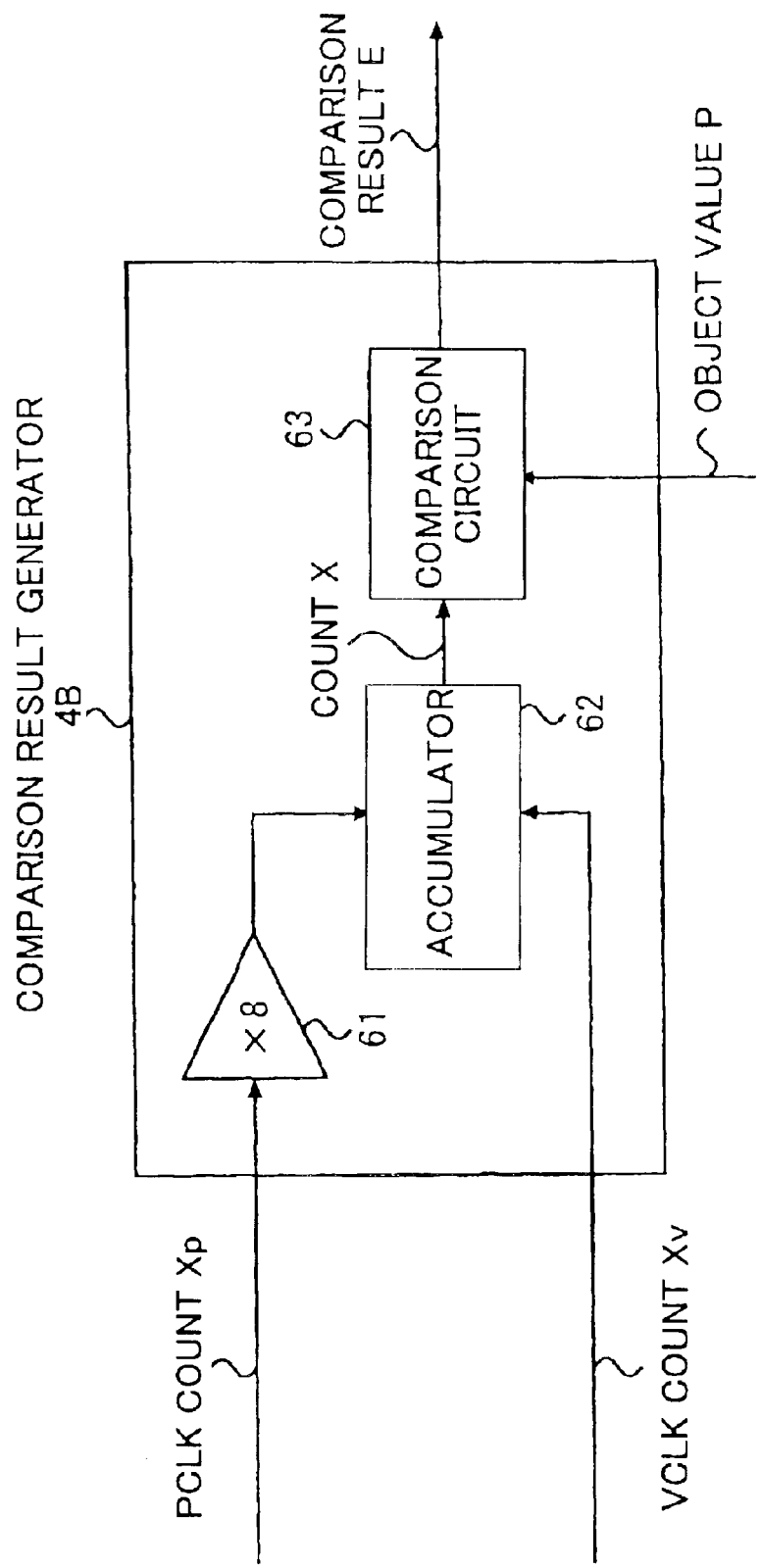
FIG. 9 is a block diagram showing another example of the configuration of the comparison result generator.

FIG. 8 and FIG. 9 show two examples of the configuration of the comparison result generator 4 in the present embodiment, and FIG. 8 shows an example of the configuration of a comparison result generator 4A wherein object values are set for the count Xv of the high frequency clock and the count Xp of the pixel clock individually, while FIG. 9 shows an example of the configuration of a comparison result generator 4B wherein the count Xp of the pixel clock is converted into a number of the high frequency clock, and the sum of the number of the high frequency clock and the count Xv of the high frequency clock is set as the object value.

Referring to FIG. 8, the comparison result generator 4A, wherein object values are set for the count Xv of the high frequency clock and the count Xp of the pixel clock individually, comprises comparison circuits 51 and 52, a multiplier 53 and an accumulator 54.

The comparison circuit 51 compares the count Xp of the pixel clock with the object value Pp of the pixel clock, and outputs their difference Ep as the pixel clock comparison result. Similarly, the comparison circuit 52 compares the count Xv of the high frequency clock with the object value Pv of the high frequency clock, and outputs their difference Ev as the high frequency clock comparison result. The multiplier 53, located at the output end of the comparison circuit 51, multiplies the pixel clock comparison result Ep with a constant number (it is eight in the present embodiment) to make the pixel clock comparison result Ep in correspondent relation with the high frequency clock. The multiplied pixel clock comparison result Ep is denoted as Ep×8. The multiplied pixel clock comparison result Ep×8 and the high frequency clock comparison result Ev are input to the accumulator 54. The accumulator 54 sums the multiplied pixel clock comparison result Ep×8 and the high frequency clock comparison result Ev, and outputs the result as the comparison result E that indicates the deviation from the ideal scanning time.

The above calculations are summarized by the following formulae.

$Ep=Xp-Pp$ (1)

$Ev=Xv-Pv$ (2)

$E=Ep\times 8+Ev$ (3)

Among the above formulae, formula (1) shows the calculation carried out in the comparison circuit 51, formula (2) shows the calculation carried out in the comparison circuit 52, and formula (3) shows the calculation carried out in the accumulator 54. By these calculations, it is possible to output the difference between the measured value and the object value using the number of the high frequency clock.

Referring to FIG. 9, the comparison result generator 4B, wherein the count Xp of the pixel clock is converted into a number of the high frequency clock, and the sum of the number of the high frequency clock and the count Xv of the high frequency clock is set as the object value, comprises a multiplier 61, an accumulator 62, and a comparison circuit 63.

The multiplier 61 multiplies the count Xp of the pixel clock with a number to convert the count Xp of the pixel clock to a corresponding number of the high frequency clock. In the present embodiment, since the pixel clock is obtained by dividing the frequency of the high frequency clock by eight, the multiplier factor of the multiplier 61 is set to eight. So the multiplied count Xp of the pixel clock is denoted as Xp×8. The accumulator 62 sums the multiplied count Xp of the pixel clock and the count Xv of the high frequency clock to calculate the count X in unit of the high frequency clock, and outputs the result to the comparison circuit 63.

The comparison circuit 63 compares the count X with the object value P, and outputs their difference E as the comparison result.

The above calculations are summarized by the following formulae.

$X=Xp\times 8+Xv$ (4)

$E=X-P$ (5)

Among the above formulae, formula (4) shows the calculation carried out in the multiplier 61 and the accumulator 62, and formula (5) shows the calculation carried out in the comparison circuit 63. By these calculations, the same as the comparison result generator 4A, it is possible to output the difference between the measured value and the object value using the number of the high frequency clock.

Data Generator 5

Below, a detailed explanation is made of the configuration of the data generator 5 shown in FIG. 2 with reference to FIG. 10, FIG. 11, and FIG. 12.

Figure 10:
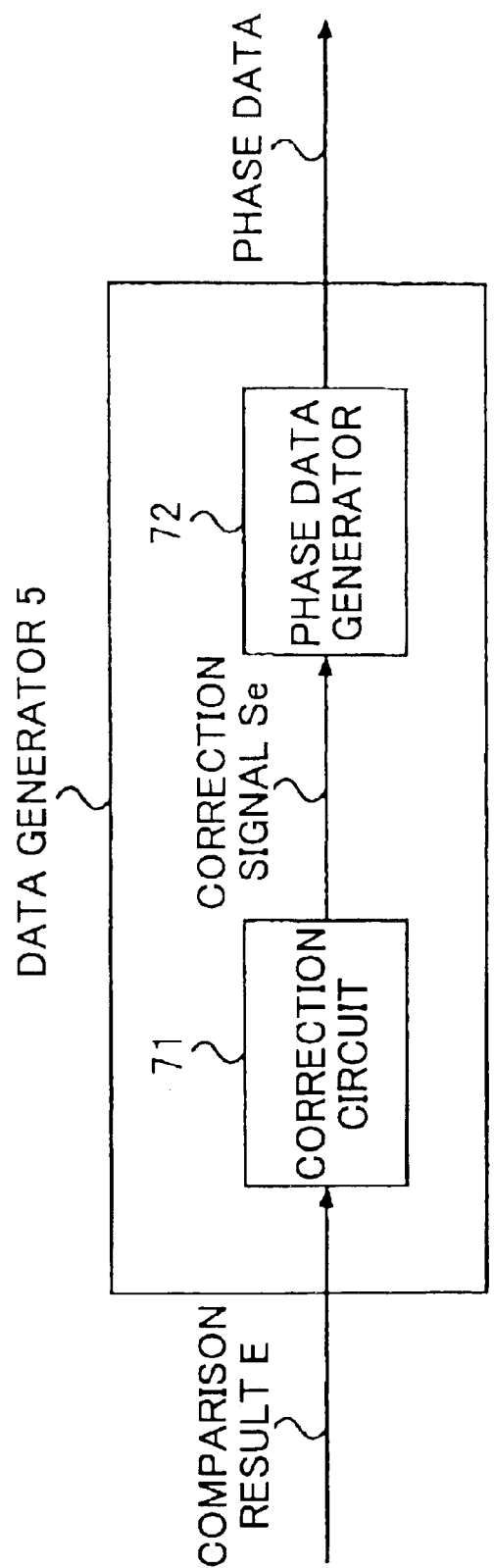
FIG. 10 is a block diagram showing a configuration of the data generator 5.

Referring to FIG. 10, the data generator 5 comprises a correction circuit 71 and a phase data generator 72. The correction circuit 71 outputs a correction signal Se based on the comparison result E input from the comparison result generator 4. Here, the correction circuit 71 is comprised of an integrator, that is, the correction circuit 71 integrates the comparison result E from the starting time of operation to the present time, and outputs a correction signal Se that has a value reflecting the last input comparison result E. In this way, the previous deviation (equivalent to the comparison result E) is stored, therefore the correction (corresponding to the correction signal Se) determined based on the stored previous deviation is associated with the change over time, so it is possible to follow the changes occurring previously and to correct them.

Note that the correction signal Se represents the correction to phase data for one line. Therefore, the phase data generator 72 outputs the phase data for one line determined based on the correction signal Se as a whole or one pixel clock pulse by one pixel clock pulse.

The phase data output from the phase data generator 72 is explained in detail with reference to FIGS. 11A through 11C. In the following explanation, the pixel clock is assumed to be obtained by dividing the frequency of the high frequency clock by eight. Under this condition, if the value of the supplied correction signal Se is zero (Se=0), as shown in FIG. 11A, the phase data output from the phase data generator 72 are all "seven". If the value of the supplied correction signal Se is positive (Se>0), as shown in FIG. 11B, the phase data are assigned to be "eight" alternately at certain intervals, and the other phase data are all "seven", and the number of phase data assigned to be "eight" is the same as the value of the correction signal Se. If the value of the supplied correction signal Se is negative (Se<0), as shown in FIG. 11C, the phase data are assigned to be "six" alternately at certain intervals, and the other phase data are all "seven", and the number of phase data assigned to be "six" is the same as the absolute value of the correction signal Se.

In this way, by distributing the pixel clock pulses to be shifted in phase according to the value of the correction signal Se, it is possible to make the scanning lengths of different lines equal while limiting the influence to the image to a low level (latent image).

Figure 12A:
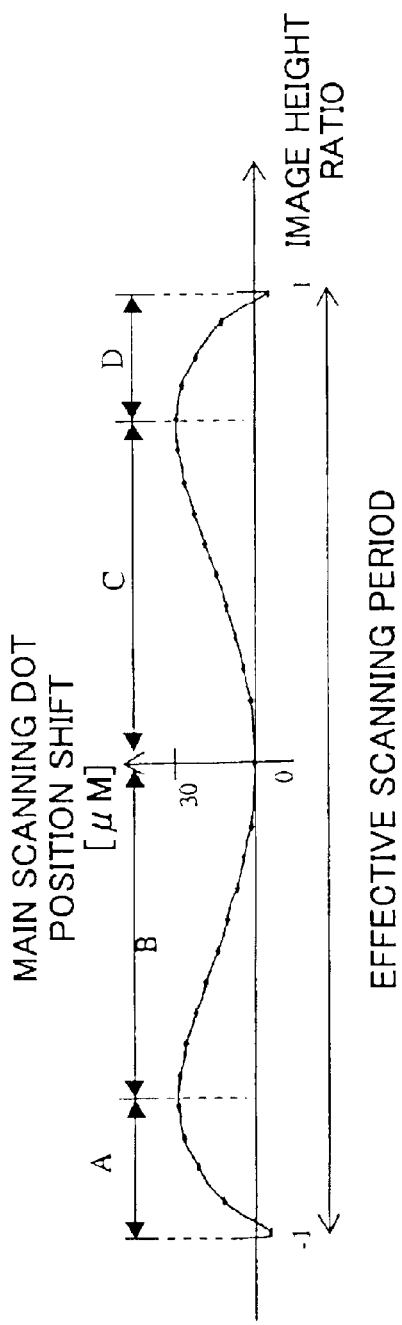
FIG. 12A is a graph showing the linearity characteristics of the optical system in a general image forming device.
Figure 12B:
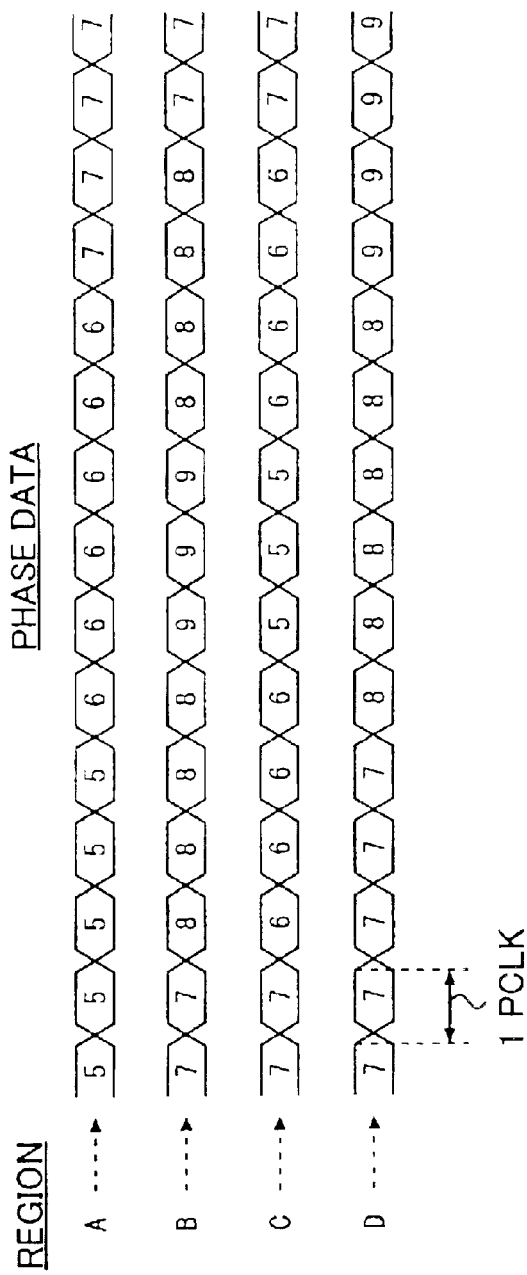
FIG. 12B is a view showing examples of the phase data created while taking the linearity characteristics into consideration.

Below, another example of operation of the phase data generator 72 is explained in detail with reference to FIGS. 12A and 12B. FIG. 12A is a graph showing the linearity characteristics of the optical system (chiefly lens) as shown in FIG. 1, and FIG. 12B is a view showing examples of the phase, data created while taking the linearity characteristics into consideration.

In a general image forming device, as shown in FIG. 12A, the slopes of the linearity curves of lenses in region A and C are positive. As a result, in region A and C, the intervals between dots are longer than that under ideal conditions. So, in the present embodiment, as shown in FIG. 12B, phase data of "five" or "six" is assigned in order to advance the phase of the pixel clock in these regions, and the greater the slope of the curve in the positive region, the smaller the phase data to be assigned.

On the other hand, as shown in FIG. 12A, the slopes of the linearity curves of lenses in region B and D are negative, and in regions B and D, the intervals between dots are shorter than that under ideal conditions. So, in the present embodiment, as shown in FIG. 12B, phase data of "nine" or "eight" is assigned in order to delay the phase of the pixel clock in these regions, and the greater the slope of the curve in the negative region, the greater the phase data to be assigned.

In this way, by changing the phase data according to the linearity characteristics, the accumulation of dot position shifts can be eliminated. In other word, when the linearity characteristics are not considered, the deviation of the scanning length caused by dependence on these characteristics is accumulated, and the scanning position of each dot includes the accumulated position shift. In contrast, by generating phase data while considering the linearity characteristics, it is possible to eliminate the shift of the scanning position of each dot, and as a result, it is possible to secure correct dot positions.

When the slope of the linearity curve is zero, because the intervals between dots need not be changed, a phase data of "seven" is assigned. Note that even in the case wherein the correction value based on the correction signal Se is distributed uniformly (at regular intervals) relative to the phase data worth of one line as mentioned above, the distribution may be concentrated in places involving large or small deviations of the scanning length caused by the linearity characteristics.

Furthermore, the total correction to the phase data caused by the linearity characteristics of the lenses is set to be equal to the value of the correction signal Se provided by the correction circuit 71. Specifically, if the value of the correction signal Se equals zero, and the number of dots in one line is Np, the phase data is generated so that the summation of the phase data for one line equals "7×Np". If the value of the correction signal Se is positive, the phase data is generated so that the summation of the phase data for one line equals "7×Np+Se". If the value of the correction signal Se is negative, the phase data is generated so that the summation of the phase data for one line equals "7×Np−|Se|".

Due to the above corrections, it is possible to make the scanning lengths of different lines equal, and it is possible to correct the deviation of the main scanning dot positions caused by the characteristics of the lenses so as to make the intervals between pixels equal.

The Second Embodiment

Below, the second embodiment of the present invention will be explained with reference to the figures.

Figure 13:
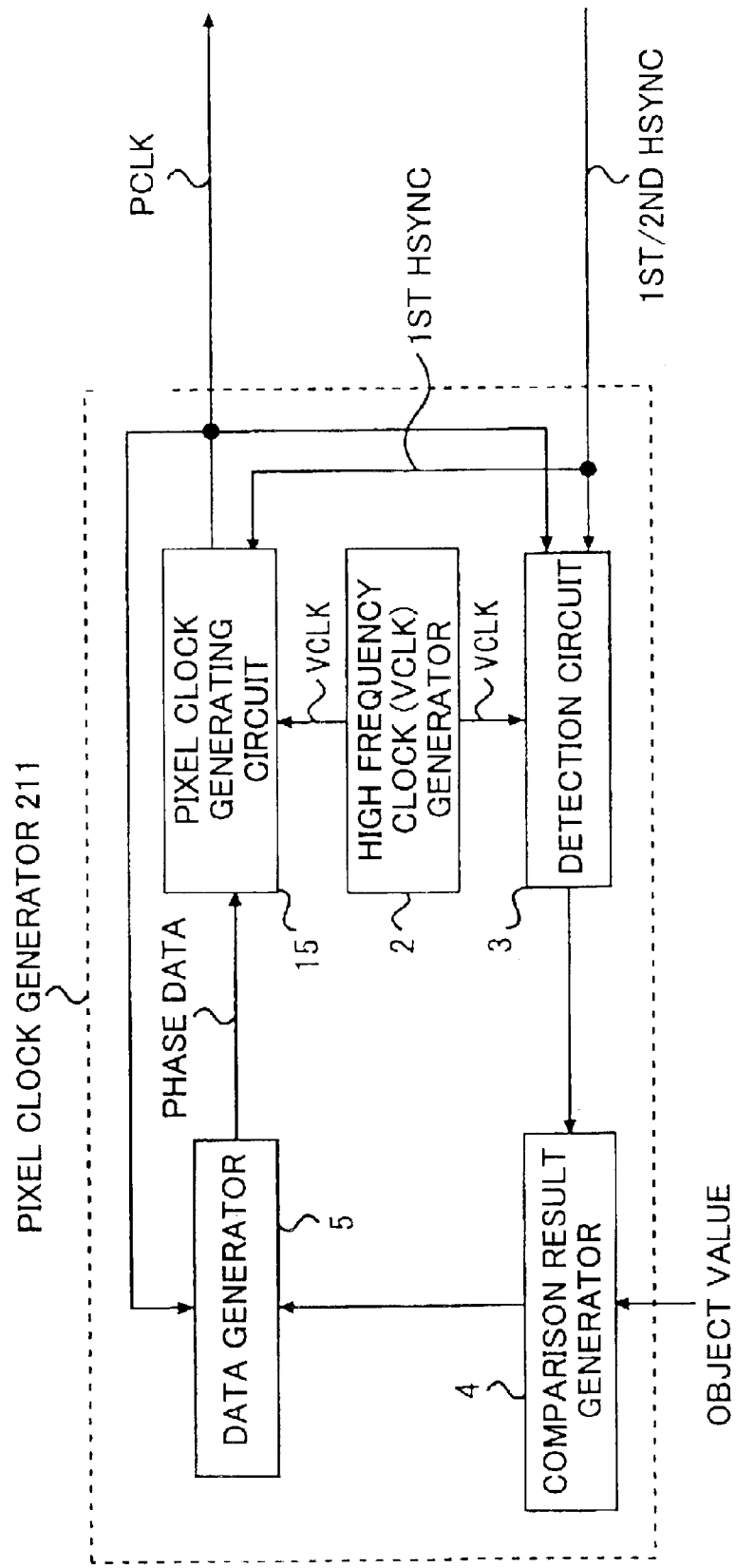
FIG. 13 is a block diagram showing a configuration of a pixel clock generator 211 according to a second embodiment of the present invention.

FIG. 13 is a block diagram showing a configuration of a pixel clock generator 211 according to the second embodiment of the present invention.

Differing from the pixel clock generator 111 in the first embodiment, the pixel clock generator 211 has a pixel clock generating circuit 15 replacing the pixel clock generating circuit 6 in the pixel clock generator 111. The pixel clock generating circuit 15 receives input of the first and the second horizontal synchronization signals. By such a configuration, it is able to generate a pixel clock with its phase synchronized, and make the write positions in different lines uniform.

Figure 14:
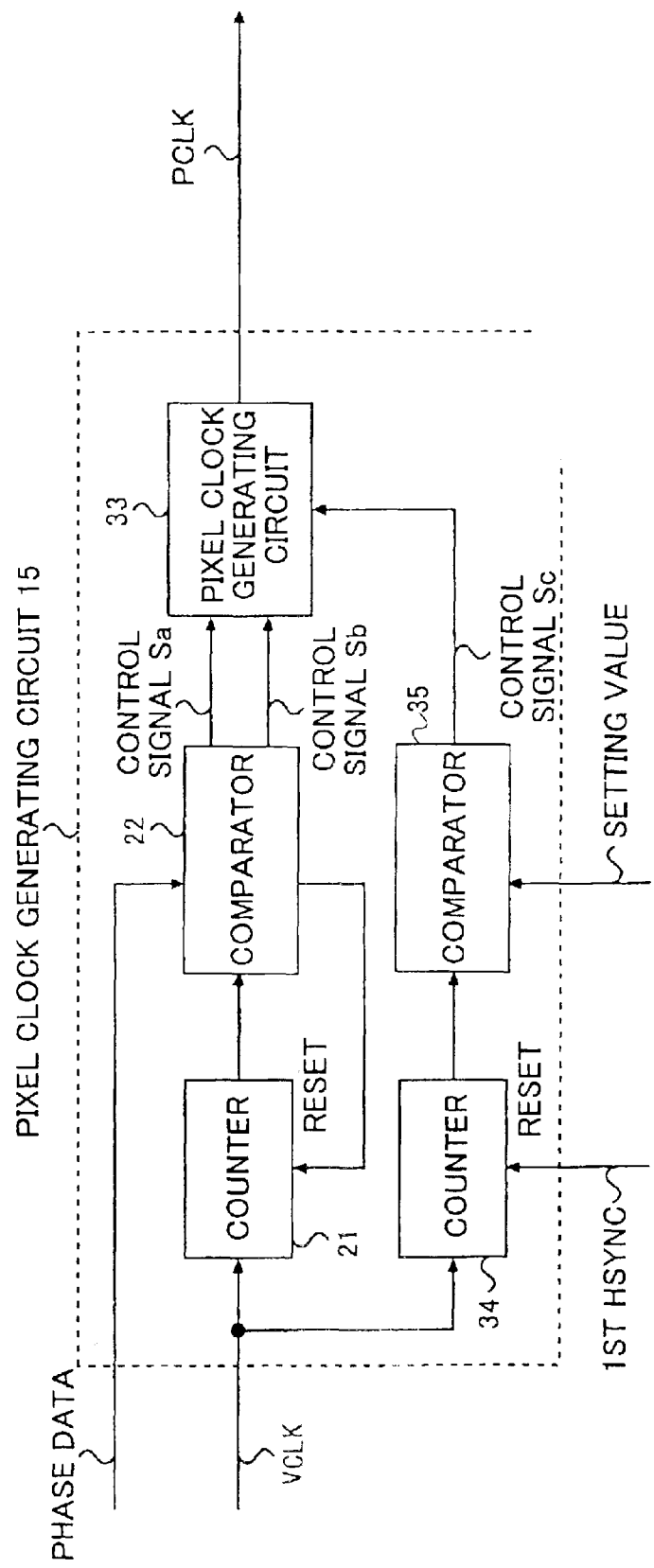
FIG. 14 is a block diagram showing the configuration of a pixel clock generating circuit 15 according to the second embodiment of the present invention.

FIG. 14 is a block diagram showing a configuration of the pixel clock generating circuit 15;

Referring to FIG. 14, differing from the pixel clock generating circuit 15 in the first embodiment, a counter 34 and a comparator 35 are added to the pixel clock generating circuit 15. The first horizontal synchronization signal and the high frequency clock are input to the counter 34, and a preset value is input to the comparator 35 from the outside. The pixel clock controller 23 in the first embodiment is replaced by a pixel clock controller 33 in the present embodiment, and the control signal Sc is input to the pixel clock controller 33.

In the pixel clock generating circuit 15, the counter 34 starts to operate at the rising time of the high frequency clock to count the number of pulses in the high frequency clock, and is reset at the time when the first horizontal synchronization signal (1st HSYNC) is input to count from zero again.

The comparator 35 compares the count in the counter 34 with a preset value input from the outside, and outputs a control signal Sc based on the comparison result. The pixel clock controller 33 controls the write timing of the pixel clock based on the control signal Sc. That is, after the control signal Sa is input, the pixel clock controller 33 does not output the pixel clock until the control signal Sa is input. By such a configuration, it is possible to make the write positions in different lines of an image uniform based on the first horizontal synchronization signal and the high frequency clock.

Below, the operation of the detection circuit 3 is explained in detail with reference to the time charts in FIG. 15. Note that the detection circuit 3 of the present embodiment is the same as that in the first embodiment.

Figure 15:
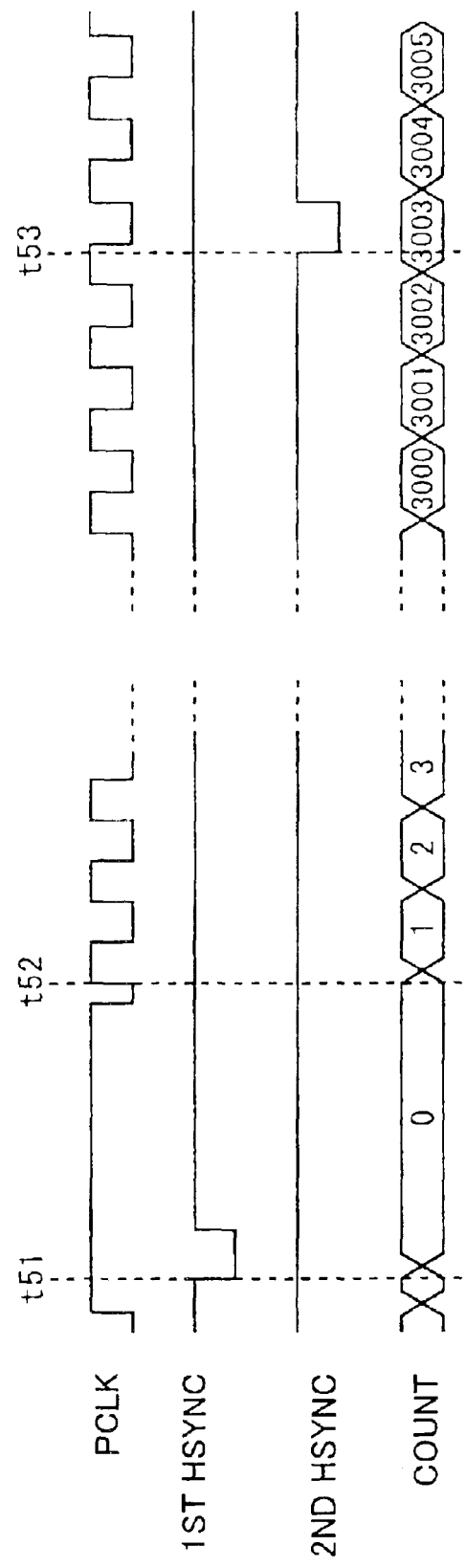
FIG. 15 is a view of time charts showing operation of the detection circuit 3 according to the second embodiment of the present invention.

FIG. 15 is a view of time charts showing operation of the detection circuit 3 in the second embodiment when counting the pixel clock. In the present embodiment, the counter 42 in the detection circuit 3 starts to operate at the rising time of the pixel clock to count the number of pulses in the pixel clock, and is reset at the falling time t51 of the first horizontal synchronization signal to count from zero again. Here, the time interval between t51 and t52 in FIG. 15 is set into the comparator 35 in the pixel clock generating circuit 15 as the image write timing. This interval serves as a period in which the output of the pixel clock is held, and can have any length as long as the resultantly generated pixel clock is sufficiently long.

The counter 42 outputs the count at the falling time t53 of the second horizontal synchronization signal as the count Xp of the pixel clock. In FIG. 15, the count Xp of the pixel clock is "3003". The time charts for counting the high frequency clock is the same as FIG. 6A, and the explanation is omitted here. In addition to the above configuration, the same configuration as that in the first embodiment is also applicable, and the explanation is also omitted.

Due to the above configurations and operation, before starting to scan the next line, it is possible to hold the write operation until the scanning position becomes the desired position, so it is possible to make the write position in different lines uniform.

The Third Embodiment

In the first embodiment, the explanation is made of a case in which the image forming device 100 utilizes a single beam optical system (a single beam scanning device), but it is possible to replace the single beam scanning device by a multi-beam scanning device. Below, as the third embodiment of the present invention, an image forming device utilizing a multi-beam beam scanning device will be explained with reference to the figures.

Figure 16:
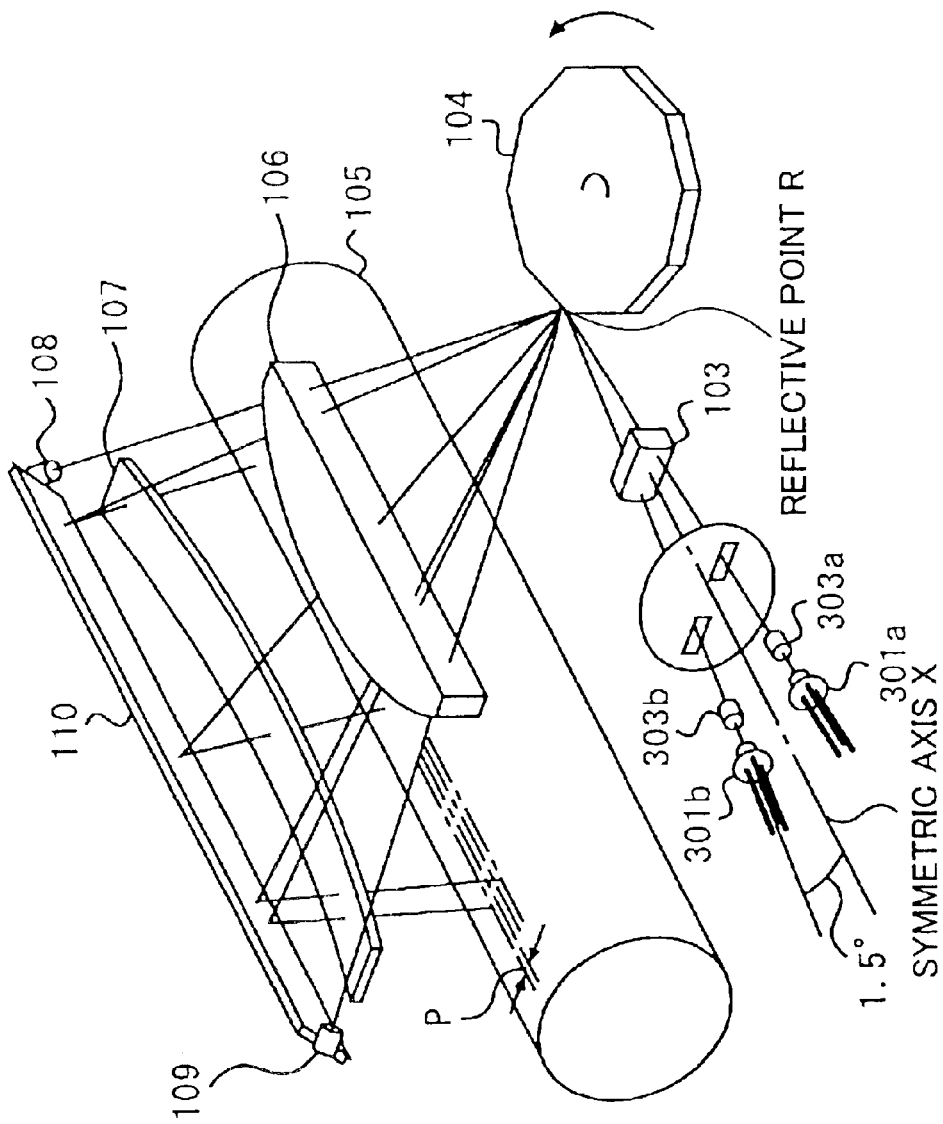
FIG. 16 is a perspective view of a configuration of a multi-beam scanning device 300 incorporated into an image forming device according to a third embodiment of the present invention.
Figure 17:
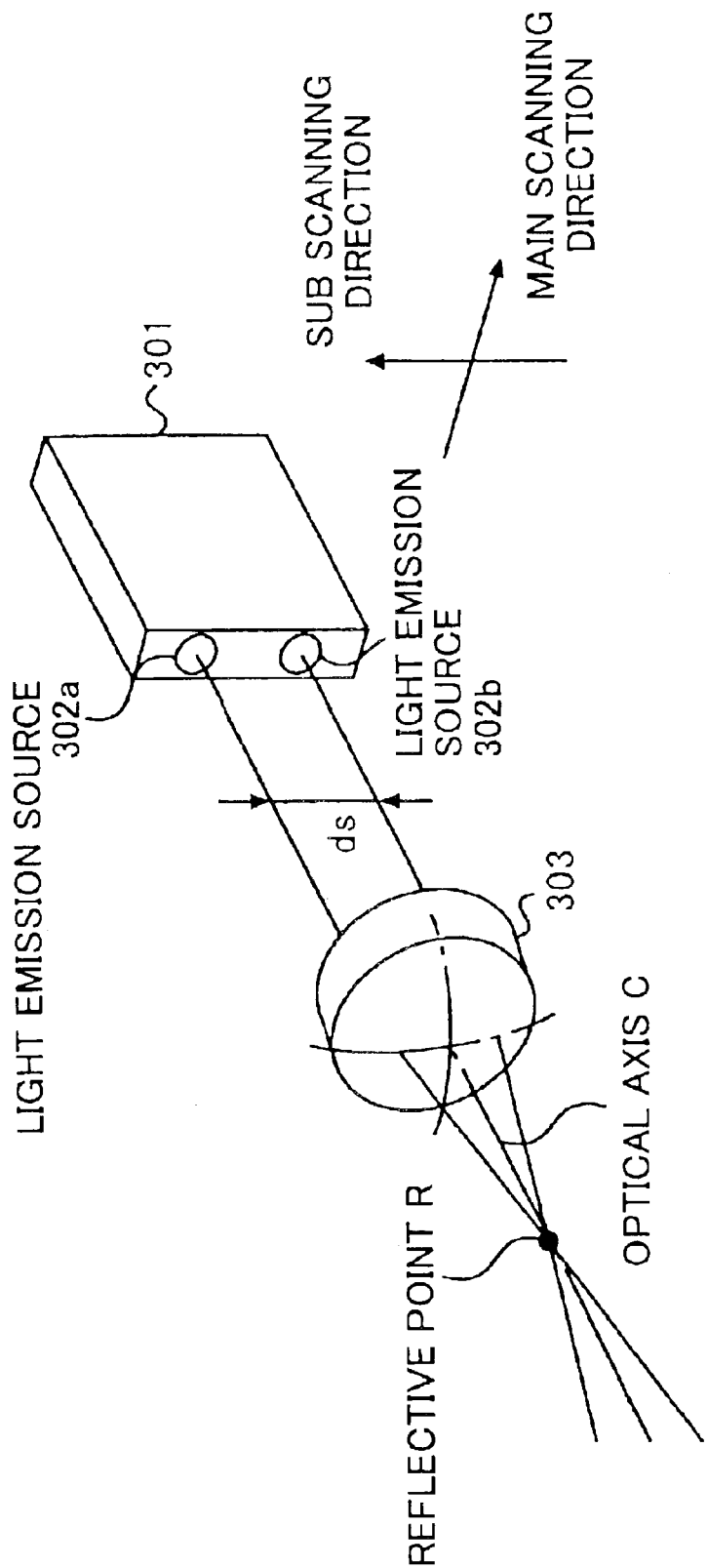
FIG. 17 is a perspective view of configurations of a semiconductor laser array 301 and a collimator 303 in the multi-beam scanning device 300.

FIG. 16 is a perspective view of a configuration of a multi-beam scanning device 300 incorporated into an image forming device according to a second embodiment of the present invention. As shown in FIG. 16, the multi-beam scanning device 300 has a semiconductor laser array 301 (corresponding to the semiconductor laser arrays 301a and 301b in FIG. 16). As shown in FIG. 17, each semiconductor laser array 301a or 301b includes two light emission sources 302a and 302b which are separated at a distance of ds=25 μm, and arranged monolithically along the sub-scanning direction and symmetrically about the optical axis C of a collimator lens 303 (corresponding to either the collimator lens 303a or the collimator lens 303b in FIG. 16). The optical axes of the two light emission sources 302a and 302b arranged along the sub-scanning direction pass through the collimator lens 303 and the cylinder lens 103, and intersect with each other at the reflective point R in the deflective plane of the polygon mirror 104.

In the multi-beam scanning device 300 having the semiconductor laser array 301, the outgoing axis of either the semiconductor laser array 301a or 301b is in coincidence with the optical axis of the corresponding collimator lens 303a or 303b. The optical axis of the corresponding collimator lens 303a or 303b is at a certain angle (1.5 degrees in FIG. 16) relative to the symmetric axis in the main scanning direction, and these optical axes intersect with each other at the reflective point R in the deflective plane of the polygon mirror 104 as shown above.

The plurality of light beams emitted from the semiconductor laser arrays 301a and 301b pass through the cylinder lens 103 and scan the polygon mirror 104 at the same time, and form images on the photo conductor 105 by the fθ lens 106 and the toroidal lens 107.

When using the multi-beam beam scanning device 300 in the image forming device 100 related to the first embodiment, printing data worth of one line is stored in the image processing device 112 shown in FIG. 1 for every four light emission sources, and they are read out in a period related to each side surface of the polygon mirror 104. Therefore, the total of four light emission sources of the semiconductor laser arrays 301a and 301b are driven simultaneously, and latent images of four lines are formed at the same time on the photo conductor 105.

Next, the multi-beam scanning device 300 will be explained in detail.

Figure 18:
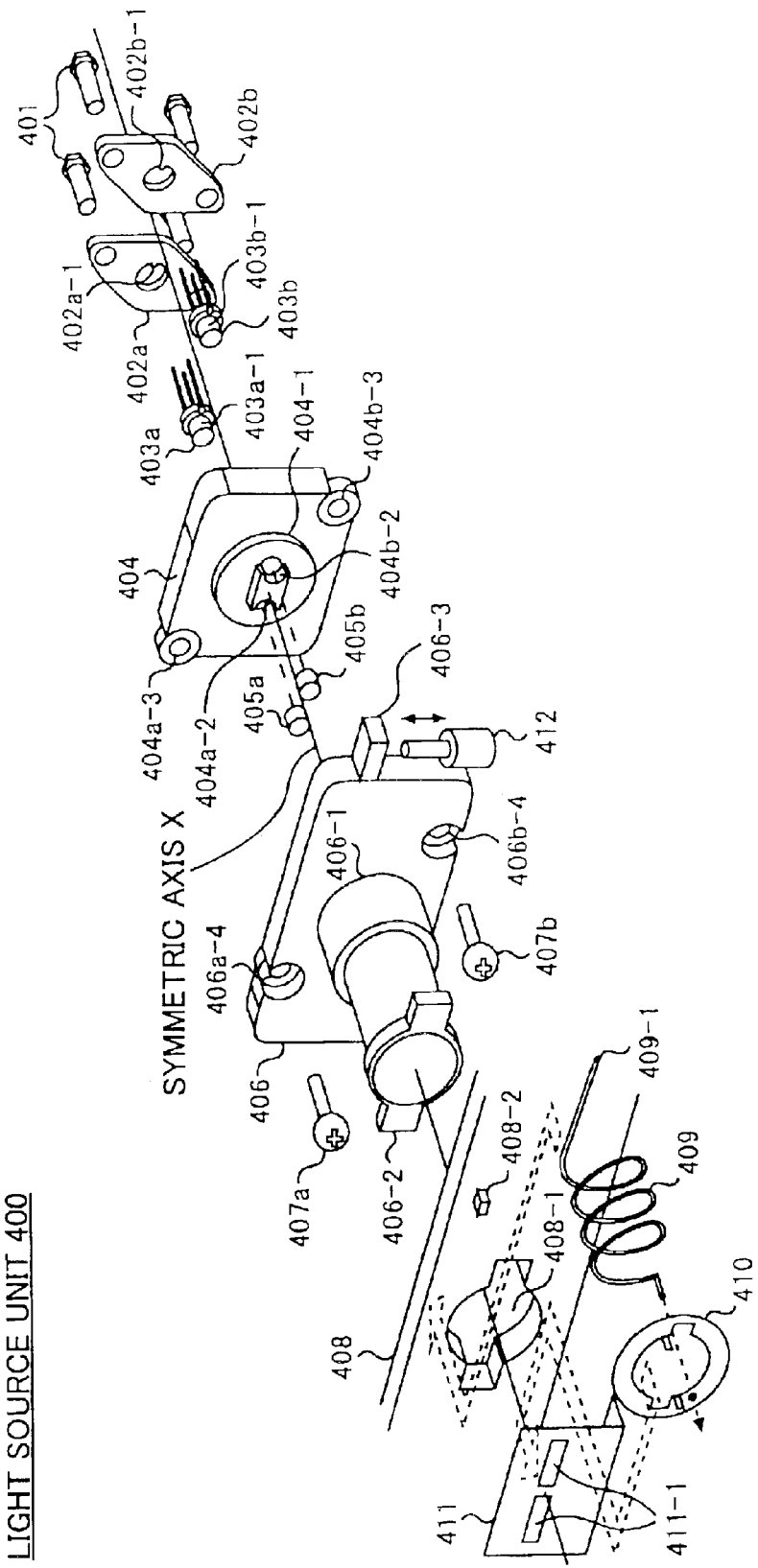
FIG. 18 is an exploded perspective view of a configuration of a light source unit 400 in the multi-beam scanning device 300.

FIG. 18 is an exploded perspective view of a configuration of a light source unit 400 in the multi-beam scanning device 300. As shown in FIG. 18, the semiconductor laser arrays 403a and 403b in the light source unit 400 are fit into the back side of the base member 404, specifically, by fitting the cylindrical heat sinks 403a-1, 403b-1 of the semiconductor laser arrays 403a and 403b into not-shown fitting holes formed to be slightly inclined at a certain angle (about 1.5 degrees in this embodiment) relative to their respective main scanning directions. The semiconductor laser arrays 403a and 403b fit in this way are pressed by pressing members 402a and 402b to be attached on the base member 404, and are fixed by the screws 401. The projection portions 402a-1 and 402b-1 of the pressing members 402a and 402b are fit in the notch portions 403a-1 and 403b-1 of the cylindrical heat sinks, and thus the light emission sources of the semiconductor laser arrays 403a and 403b are arranged in an aligned light.

The peripheries of the collimator lens 405a and 405b are attached with an adhesive to the semi circular guide surfaces 404a-2 and 404b-2 of the base member 404, and the optical axes of the collimator lens 405a and 405b are finely adjusted and are positioned, so as to convert the divergent beams emitted from the light emission sources of the semiconductor laser arrays 403a and 403b into parallel beams.

In the present embodiment, in order for the light beams from the semiconductor laser arrays 403a and 403b to intersect with each other in the main scanning plane, the fitting holes (fitting holes on the back side of the base member 404) and the semi circular guide surfaces 404a-2 and 404b-2 formed along the light beams are arranged to be symmetrically inclined at a certain angle (1.5 degrees in FIG. 16) relative to the symmetric axis X.

The cylindrical engaging portion 404-1 of the base member 404 is engaged with the back face of the holding member 406, and the screws 407a and 407b are screwed into the screw holes 404a-3 and 404b-3 passing through the though-holes 406a-4 and 406b-4, thereby the base member 404 and the holding member 406 are fixed to form the light source unit 400.

Figure 22A:
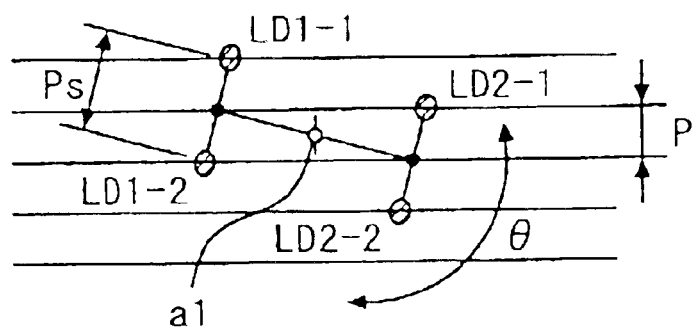
FIG. 22A is a view of beam spots formed on the photo conductor 105 by the light source unit. 300.

The cylindrical portion 406-1 of the holder 406 is fitted into the reference hole 408-1 formed on a fixing wall 408 of the optical housing, and a spring 409 is inserted from the front side to press and join a stopper 410 with the front end of the cylindrical portion 406-2. Therefore, the holder 406 is held being in close contact with the back side of the fixing wall 408. Since the end 409-1 of the spring 409 is hooked on a projecting portion 408-2 formed on the fixing wall 408, there occurs a torque relative to the center of the cylindrical portion 406-1, which is the rotational axis (corresponding to the symmetric axis X). To latch the torque, an adjusting screw 412 is provided which is able to be screwed into the stopper 406-3, by adjusting the screw 412, the unit is rotated as a whole relative to the rotational axis, and as shown in FIG. 22A, it is possible to shift each row of beam spots by one line to situate the rows of beam spots alternately.

In correspondence with the semiconductor laser arrays 403a and 403b, there are made slits 411-1 in the aperture 411 and fixed on the optical housing to define the size of the light beam.

Figure 19:
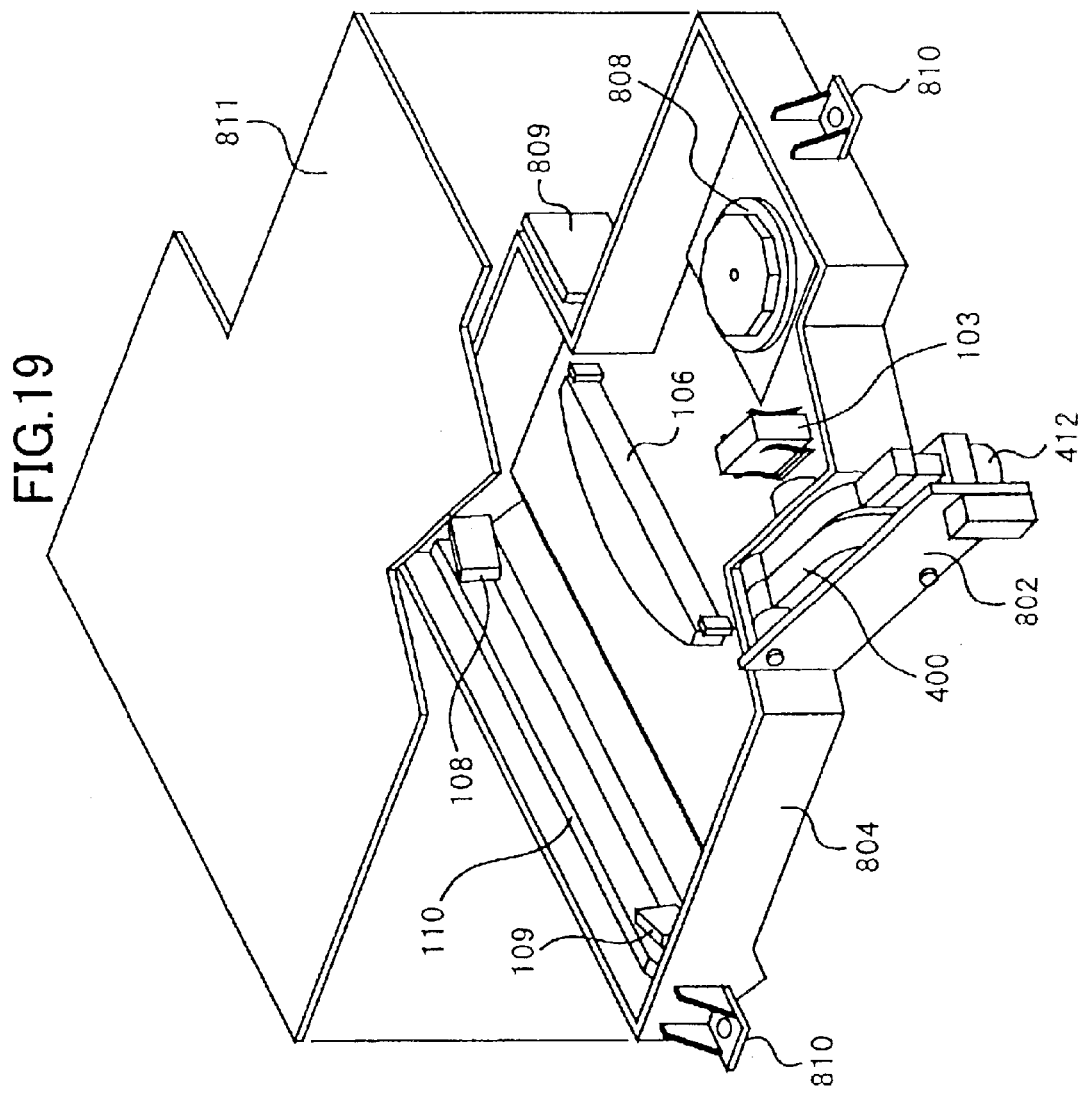
FIG. 19 is a perspective view of a configuration of a multi-beam scanning device 800 wherein the light source unit 400 is accommodated in the optical housing 804.

FIG. 19 is a perspective view of a configuration of a multi-beam scanning device 800 wherein the light source unit 400 is accommodated in the optical housing 804.

Referring to FIG. 19, a print board 802 formed with a driving circuit for controlling the semiconductor laser arrays 403a and 403b is attached on the back side of the light source unit 400, and with the above spring 409, the print board 802 is brought into contact with the side wall of the optical housing 804 that intersects with the optical axis at a right angle. The adjusting screw 412 adjusts the orientation of the light source unit 400 and then fixes it.

Inside the optical housing 804, the, cylinder lens 103, a polygon motor 808 that turns the above polygon mirror 104, the fθ lens 106, and the mirror 110 are appropriately positioned and are fixed. The laser beams emitted from the light source unit 400 are deflected by the polygon mirror 104. At two points in the region where the deflected laser beams pass through, two photo detectors 108 and 109 are placed, for example, at two ends of the mirror 110 to the scanning laser beams, and to output the first horizontal synchronization signal (1st HSYNC) and the second horizontal synchronization signal (2nd HSYNC). The same as the light source unit 400, the print board 809 mounted with a synchronization detection sensor is attached on the side wall of the optical housing 804 from the outside. The optical housing 804 is sealed on the upper side by a cover 811, and is fixed on a frame of the body of the image forming device by screws at the mounting members 810 that are projecting from the side wall.

Figure 20:
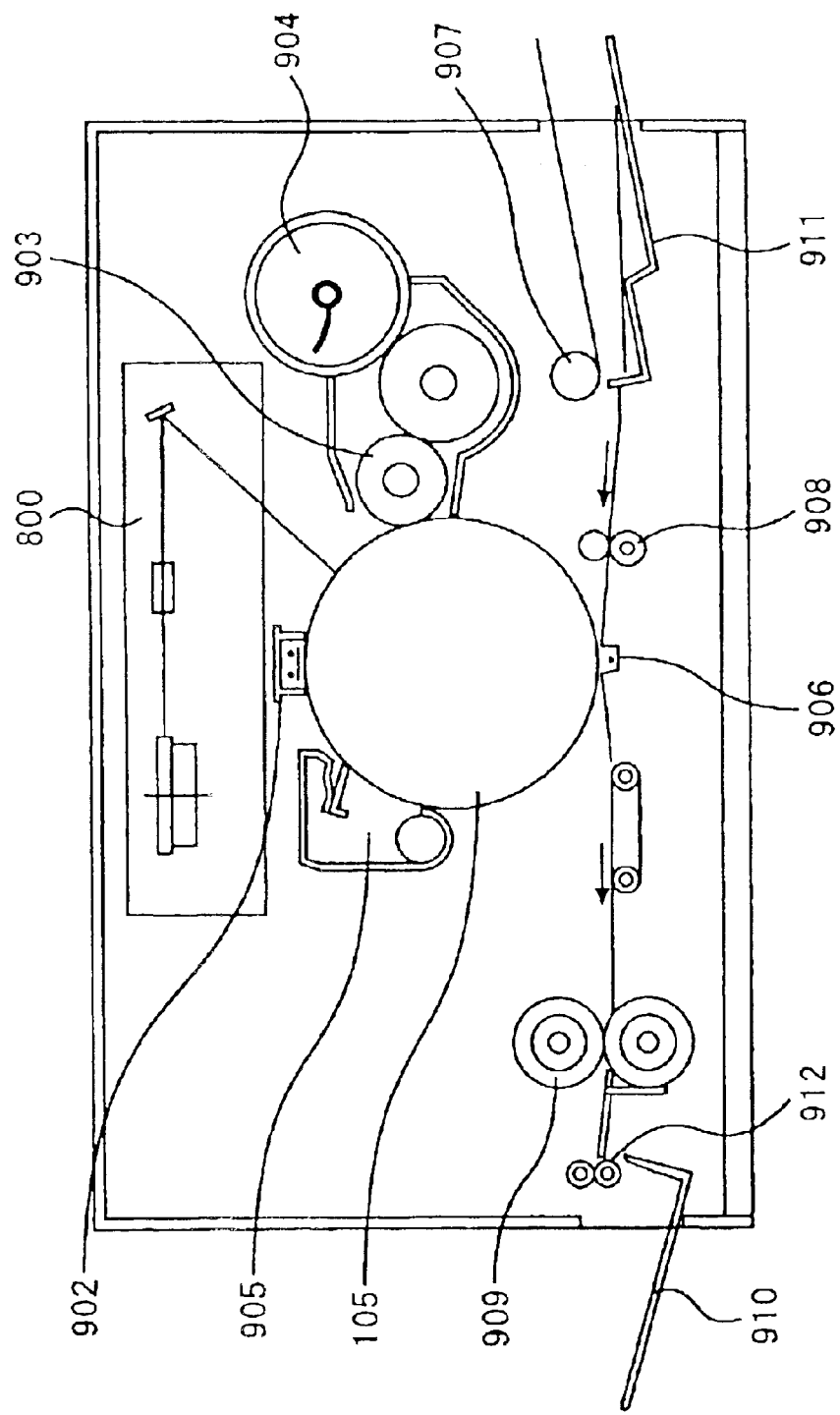
FIG. 20 is a view showing a configuration of an image forming device 900 including the multi-beam scanning device 800.

FIG. 20 is a view showing a configuration of an image forming device 900 including the multi-beam scanning device 800. Referring to FIG. 20, in the image forming device 900, surrounding the photo conductor 105 (also called as photo conductor drum) providing the scanning surface, there are arranged a charger 902 for charging the photo conductor 105 to a high voltage, a developing roller 903 for attaching charged toner to the electrostatic latent image recorded by the multi-beam scanning device 800 to turn the latent image into a visible image, a toner cartridge 904 for supplying toner to the developing roller 903, and a cleaning case 905 for removing and storing the residual toner on the photo drum 105.

As mentioned above, a number of lines of a latent image are recorded on the photo drum 105 at the same time. The recording paper is supplied from the tray 911 by the supplier 907, and is fed by the resist rollers 908 at the exact time when recording in the sub-scanning direction starts. Then, when the recording paper passes through the photo conductor drum 105, toner is transferred to the paper by a transfer charger 906, and is fused by a fusing roller 909, and is delivered to the delivery tray by a delivery roller 912.

The Fourth Embodiment

Below, as the fourth embodiment of the present invention, another example of the light source unit will be explained in detail with reference to the figures.

Figure 21:
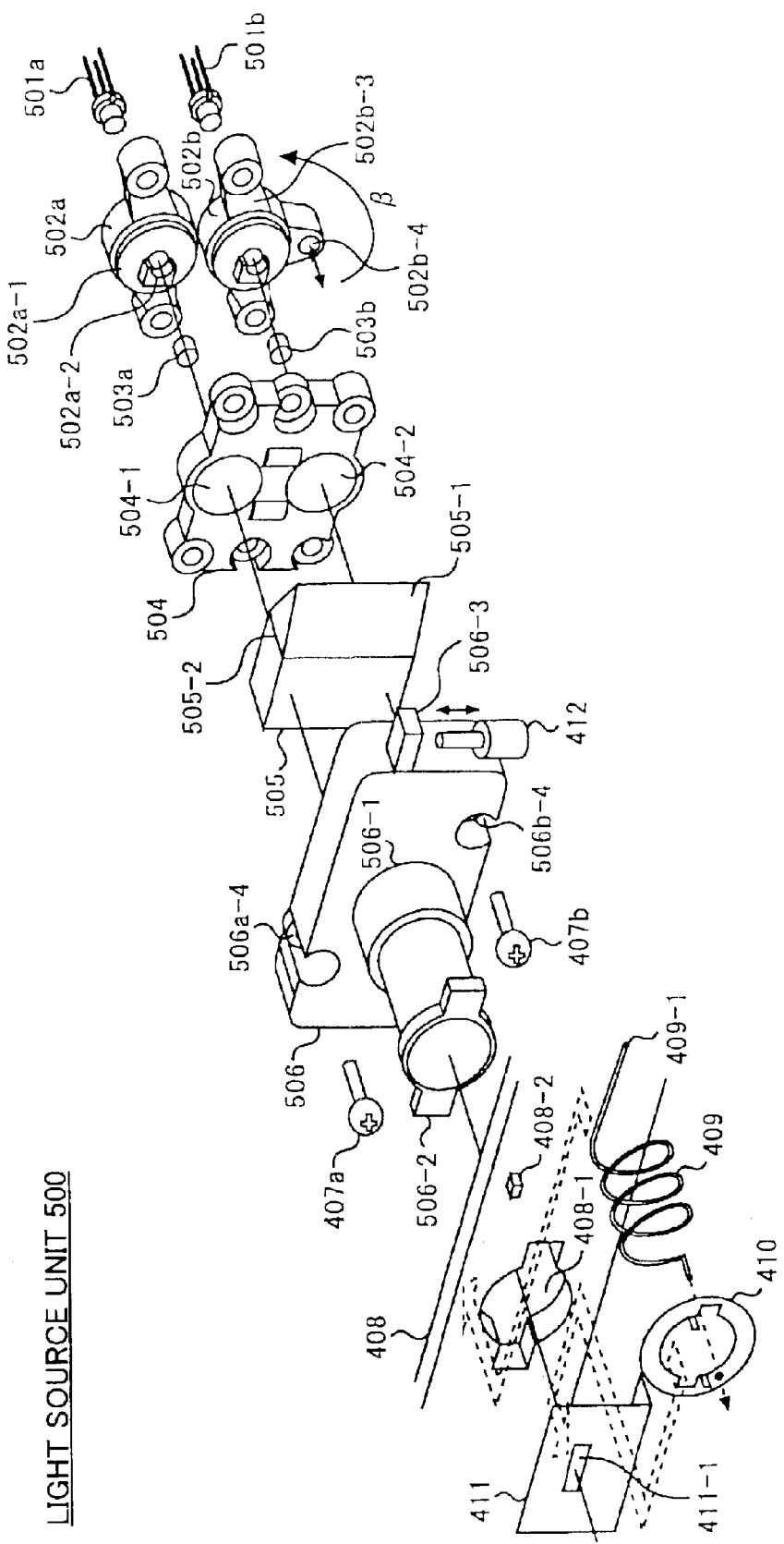
FIG. 21 is an exploded perspective view of a configuration of a light source unit 500 according to a fourth embodiment of the present invention.

FIG. 21 is an exploded perspective view of a configuration of a light source unit 500 according to a fourth embodiment of the present invention. As shown in FIG. 21, the light source unit 500 of the present embodiment uses a prism 505 having a plane 505-1 inclined at a certain angle relative to the optical axis so as to combine the light beams from the two semiconductor laser arrays 501a and 501b.

In this configuration, just as in the light source unit 400 shown in the third embodiment, the semiconductor laser arrays 501a and 501b, and the collimator lens 503a and 503b are supported by the base member 502a and 502b, respectively, forming the first light source and the second light source.

The cylindrical engagement portions 502a-1 and 502b-1 of the first base member 502a and the second base member 502b are engaged in holes 504-a and 504-2 formed on the same flange 504, and the same as the light source unit 400, the first base member 502a and the second base member 502b are fixed by screws.

Figure 22B:
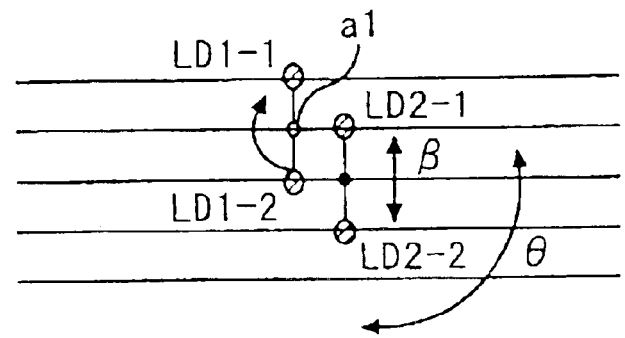
FIG. 22B is a view of beam spots formed on the photo conductor 105 by the light source unit 400.

An adjusting screw 502b-4 is screwed into the second base member 502b, and its projection can be adjusted from the back side. Therefore, the arms 502b-3 of the base members 502a, 502b are twisted, and the two semiconductor laser arrays 501a and 501b and the holding members of the collimator lens 503a and 503b are inclined in the sub-scanning direction β. Due to this, it is possible to shift each row of beam spots by one line and to make an arrangement as shown in FIG. 22B.

The prism 505 including a parallelogram prism and a triangular prism reflects the light beams from the second light source on the inclined plane 505-1, and further reflects the light beams on the beam-splitter-plane 505-2, and brings those light beams close to the light beams coming directly from the first light source. These beams in close proximity, for example, scan the polygon mirror 104 at the same time, and form individual light spots on the photo conductor 105.

The same as in the light source unit 400, the aperture 411 is fixed on the optical housing In the present embodiment, the light beams from the semiconductor laser arrays 501a and 501b are substantially overlapped, so a common slit 411-1 is formed in the aperture 411. Furthermore, the flange 504 has the same configuration as with the light source unit 400. It is held by the holder 506, and a cylindrical portion 506-1 of the holder 506 is fitted into a reference hole formed on the fixing wall of the optical housing 408. As a result, the same as the light source unit 400, by rotating the light source unit 500 as a whole, it is possible to correct the slope of the row of beam spots.

The Fifth Embodiment

Figure 23:
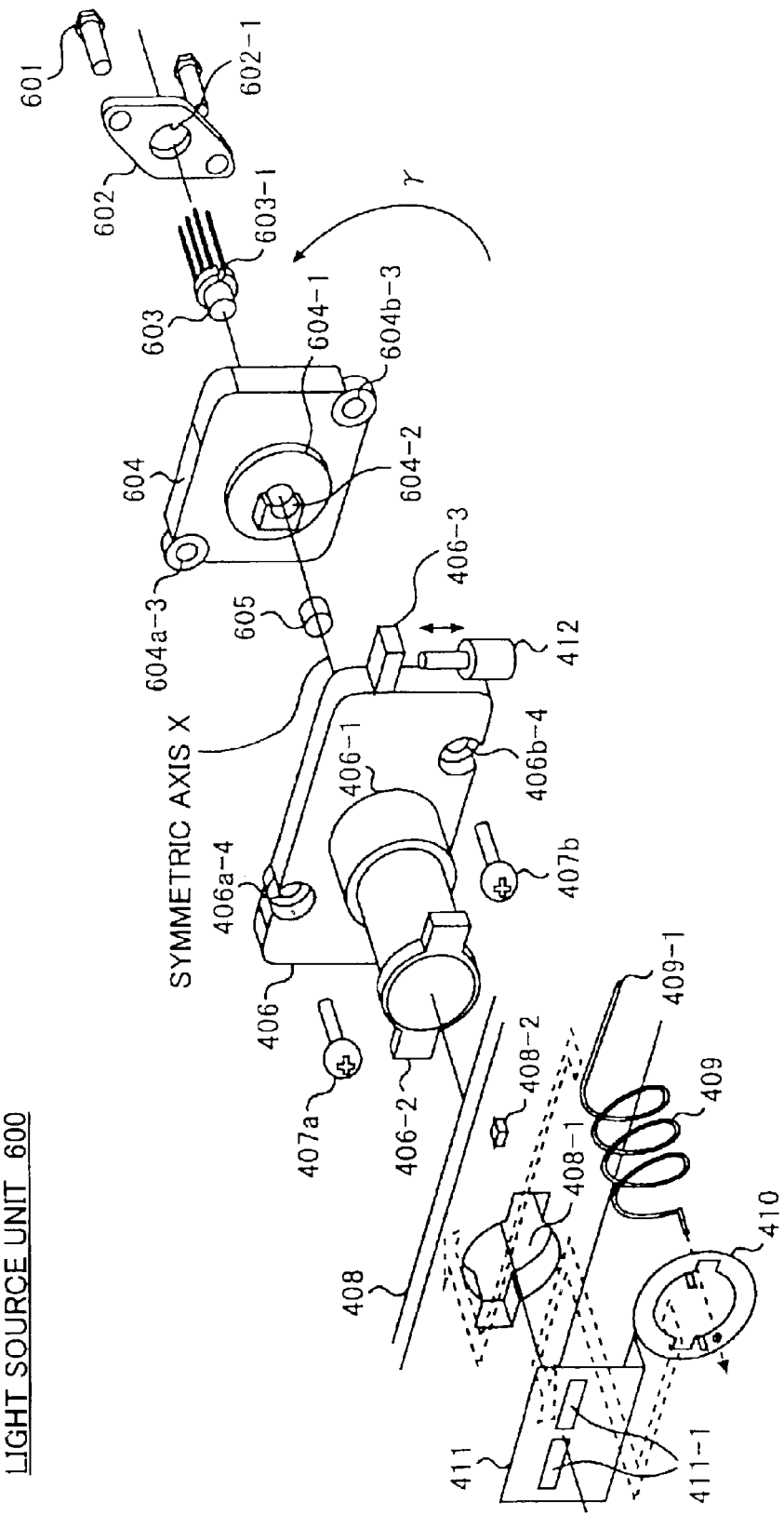
FIG. 23 is an exploded perspective view of a configuration of a light source unit 600 according to a fifth embodiment of the present invention.
Figure 24:
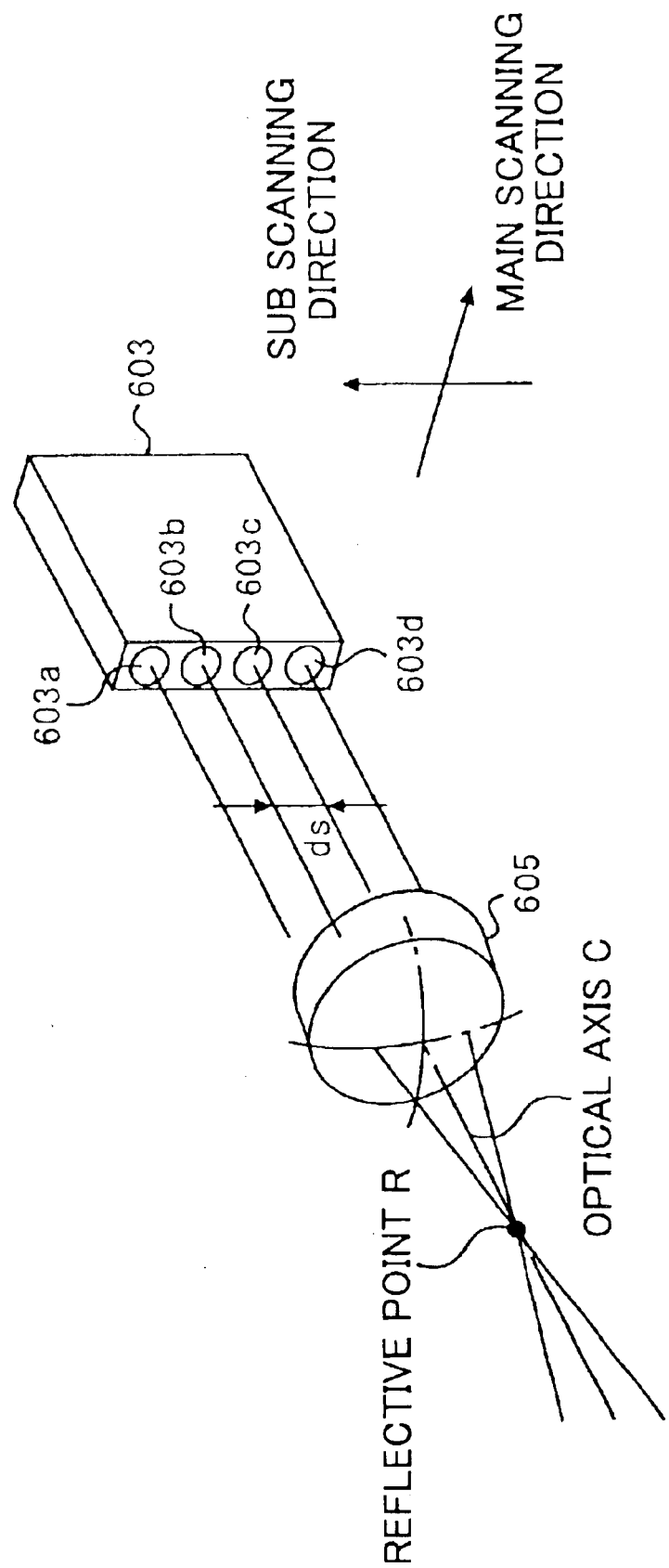
FIG. 24 is a perspective view of configurations of a semiconductor four-channel laser array 603 and a collimator 605 in the multi-beam scanning device 600.
Figure 25:
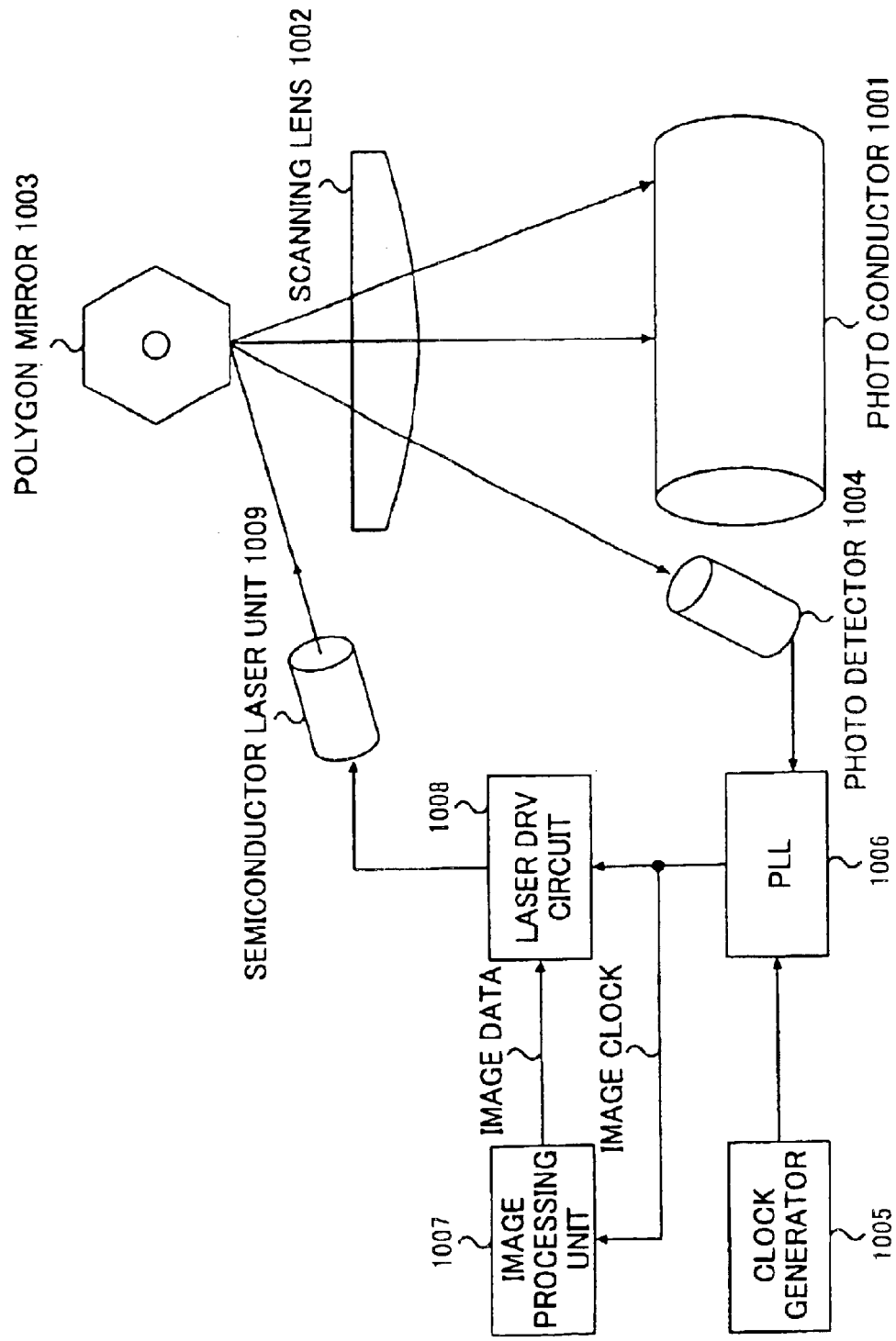
FIG. 25 is a view showing a general configuration of an image forming device of the related art.
Figure 26:
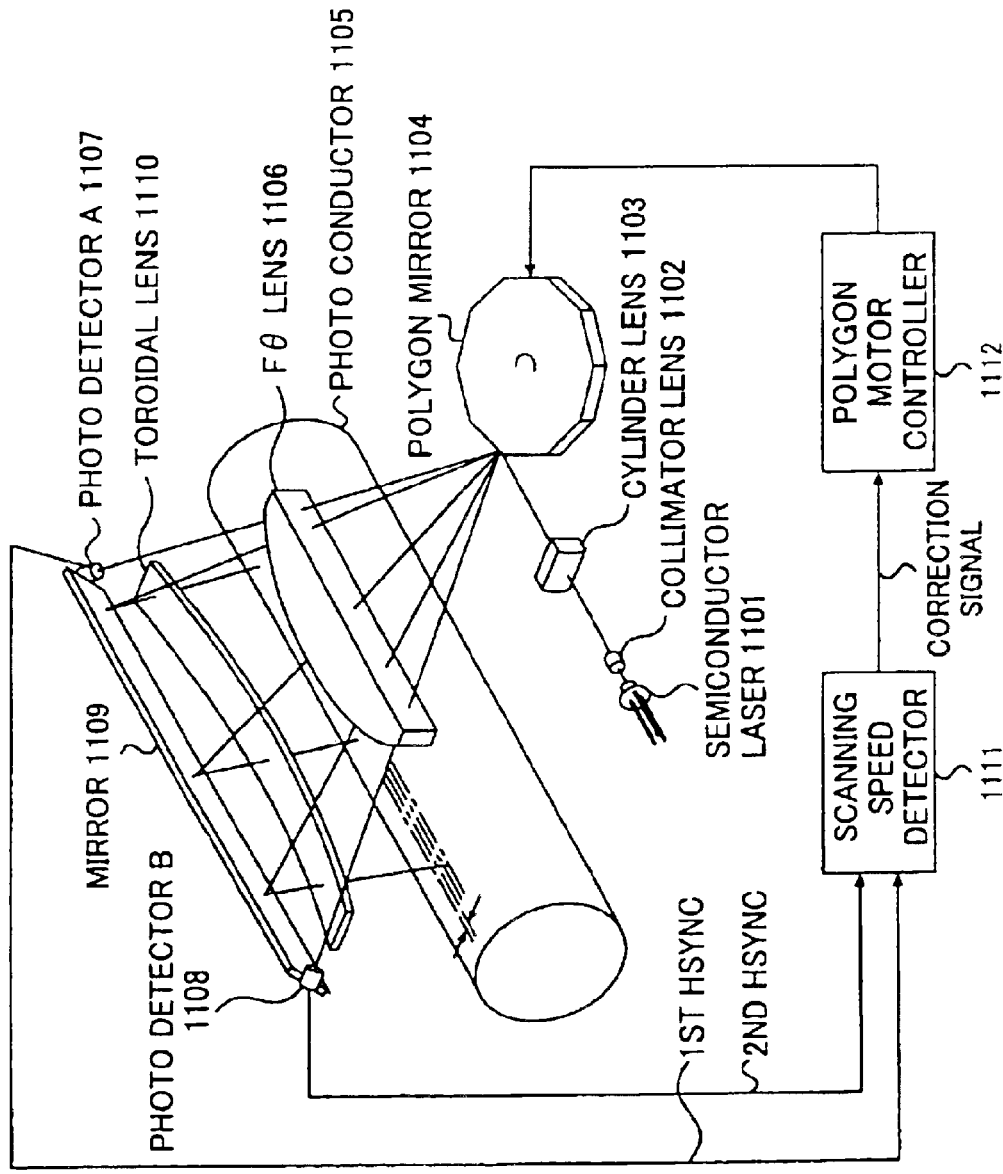
FIG. 26 is a view showing a specific configuration of an image forming device of the related art.

As another configuration of the light source unit, for example, a four-channel semiconductor laser array 603 as shown in FIG. 23 may also be incorporated into the semiconductor laser array. Below, as the fifth embodiment of the present invention, this example of the light source unit is shown in FIG. 23 and FIG. 24. Because its configuration is easily understandable from the explanations of the light source unit 400 and 500, explanation is omitted.

While the present invention has been described with reference to specific embodiments chosen for purpose of illustration, it should be apparent that the invention is not limited to these embodiments, but numerous modifications could be made thereto by those skilled in the art without departing from the basic concept and scope of the invention.

For example, the pixel clock generating device related to the present invention is not limited to the multi-beam or single beam scanning devices; it is applicable to any scanning device involving scanning a surface based on a pixel clock.

Summarizing the effect of the invention, according to the present invention as shown above, an object value is set beforehand, and correction is made based on the comparison result of the object value and the measured value. Due to this, it becomes possible to correct with high precision the fluctuation of the scanning length caused by the difference of the reflection planes of the polygon mirror and by a change with time of the revolving condition of the polygon mirror. Furthermore, the present invention is able to control the phase of the pixel clock based on the phase decided by the high frequency clock. Accordingly, it is possible to control the phase of the pixel clock with high precision but a simple configuration, and to correct the fluctuation of the scanning length with high precision.

Further, it becomes possible to generate phase data to eliminate the difference between the object value and the measured value, and make write positions in different lines uniform.

Further, it becomes possible to compare the object value and the measured value and determine the correction value in units of the pixel clock and the high frequency clock. And, it becomes possible to determine the correction value based on the high frequency clock that defines the minimum unit.

Further, it becomes possible to use a counter or similar configurations to count the pixel clock and the high frequency clock and to make comparison and correction by using digital values.

Further, it becomes possible to easily make the comparison between the measured value and the object value when the scanning time is measured by using both the pixel clock and the high frequency clock.

Even when the scanning time is measured by using both the pixel clock and the high frequency clock, it becomes possible to make the comparison between the measured value and the object value, and to easily generate the phase data by using the thus obtained comparison result.

It becomes possible to determine the correction value based on the difference obtained from the comparison between the measured value and the object value, and to generate the phase data on the basis of the correction value. And it becomes possible to appropriately correct the fluctuation of the scanning length due to changes with time, and it becomes possible to store changes with time by a simple configuration.

By shifting a relevant phase of the pixel clock by a desired amount, it becomes possible to make the scanning lengths of different lines equal while limiting the influence on the image to a low level.

By distributing the correction value in the pixel clock to be shifted in phases, it becomes possible to make the scanning lengths of different lines equal while limiting the influence on the image to a low level.

By shifting the phase of the pixel clock according to the characteristics of the optical configuration, it becomes possible to make the scanning lengths of different lines equal while the correction of the main scanning dot position of the image is corrected. And, it becomes possible to perform phase control for the pixel clock at smaller steps by using a relatively simple configuration, without using the high frequency clock.

Further, it becomes possible to provide a laser scanning device having a single light source and including the above pixel clock generating device. And it becomes possible to provide a laser scanning device having a plurality of light sources and including the above pixel clock generating device. And it becomes possible to provide a laser scanning device able to scan a plurality of lines at one time.

Furthermore, it becomes possible to provide an image forming device including the above laser scanning device.

This patent application is based on Japanese priority patent application No. 2002-108158 filed on Apr. 10, 2002, the entire contents of which are hereby incorporated by reference.

What is claimed is:

1. A pixel clock generating device, comprising:
   a measurement unit configured to measure a scanning time required for scanning a length and to output a measured value;
   a pixel clock generating unit configured to generate a pixel clock;
   a reference clock generating unit configured to generate a reference clock having a frequency higher than the pixel clock,
   wherein a phase of the pixel clock is controlled based on (i) the reference clock and (ii) a comparison result between the measured scanning time and a preset scanning time;
   a comparison result outputting unit configured to compare the measured scanning time and the preset scanning time and to output a difference between the measured scanning time and the preset scanning time as said comparison result;
   a phase data generating unit configured to generate phase data used for controlling the duration of the level of the pixel clock based on the comparison result,
   wherein the pixel clock generating unit generates the pixel clock based on the phase data,
   the measurement unit obtains the measured scanning time by counting the reference clock or the pixel clock, and
   the comparison result outputting unit outputs said comparison result using the count of the reference clock or the count of the pixel clock; and
   a conversion unit configured to convert the count of the pixel clock obtained in the measurement unit to the count of the reference clock,
   wherein the comparison result outputting unit outputs said comparison result using the count of the reference clock.

2. The pixel clock generating device as claimed in claim 1, wherein the preset value is set by using the count of the reference clock, and
   the comparison result outputting unit obtains the comparison result by comparing the count of the reference clock obtained in the conversion unit with the preset value thereof.

3. The pixel clock generating device as claimed in claim 1, wherein the phase data generating unit generates the phase data based on a correction value for shifting the phase of the pixel clock associated with a pixel at a position in an image forming region.

4. The pixel clock generating device as claimed in claim 3, wherein the phase data generating unit generates the phase data by distributing the correction value at equal intervals in each portion of the pixel clock related with one line.

5. The pixel clock generating device as claimed in claim 3, wherein the phase data generating unit generates the phase data by distributing the correction value based on a scanning speed in the image forming region.

6. The pixel clock generating device as claimed in claim 1, wherein the pixel clock generating unit comprises:
   a counting unit configured to count the reference clock;
   a comparison unit configured to compare the count of the counting unit with the phase data; and
   a pixel clock control unit configured to change states of the pixel clock based on a result of the comparison unit.

7. A pixel clock generating device, comprising:
   a measurement unit configured to measure a scanning time required for scanning a length and to output a measured value;
   a pixel clock generating unit configured to generate a pixel clock;
   a reference clock generating unit configured to generate a reference clock having a frequency higher than the pixel clock,
   wherein a phase of the pixel clock is controlled based on (i) the reference clock and (ii) a comparison result between the measured scanning time and a preset scanning time;
   a comparison result outputting unit configured to compare the measured scanning time and the preset scanning time and to output a difference between the measured scanning time and the preset scanning time as said comparison result; and
   a phase data generating unit configured to generate phase data used for controlling the duration of the level of the pixel clock based on the comparison result,
   wherein the pixel clock generating unit generates the pixel clock based on the phase data,
   the measurement unit obtains the measured scanning time by counting the reference clock or the pixel clock,
   the comparison result outputting unit outputs said comparison result using the count of the reference clock or the count of the pixel clock, and the measurement unit comprises:

a first counting unit configured to count the measured scanning time based on the pixel clock; and a second counting unit configured to count a fractional part not counted by the first counting unit based on the reference clock.

8. The pixel clock generating device as claimed in claim 7, wherein the second counting unit counts once in each period of the reference clock.

9. A pixel clock generating device, comprising:

a measurement unit configured to measure a scanning time required for scanning a length and to output a measured value;

a pixel clock generating unit configured to generate a pixel clock;

a reference clock generating unit configured to generate a reference clock having a frequency higher than the pixel clock, wherein a phase of the pixel clock is controlled based on (i) the reference clock and (ii) a comparison result between the measured scanning time and a preset scanning time;

a comparison result outputting unit configured to compare the measured scanning time and the preset scanning time and to output a difference between the measured scanning time and the preset scanning time as said comparison result; and a phase data generating unit configured to generate phase data used for controlling the duration of the level of the pixel clock based on the comparison result, wherein the pixel clock generating unit generates the pixel clock based on the phase data, the measurement unit obtains the measured scanning time by counting the reference clock or the pixel clock, the comparison result outputting unit outputs said comparison result using the count of the reference clock or the count of the pixel clock, a preset value of the count of the reference clock and a preset value of the count of the pixel clock are set individually, and the comparison result outputting unit obtains the comparison result by comparing the count of the reference clock obtained in the measurement unit with the preset value thereof and by comparing the count of the pixel clock with the preset value thereof, respectively.

10. A pixel clock generating device, comprising:

a measurement unit configured to measure a scanning time required for scanning a length and to output a measured value;

a pixel clock generating unit configured to generate a pixel clock;

a reference clock generating unit configured to generate a reference clock having a frequency higher than the pixel clock, wherein a phase of the pixel clock is controlled based on (i) the reference clock and (ii) a comparison result between the measured scanning time and a preset scanning time;

a comparison result outputting unit configured to compare the measured scanning time and the preset scanning time and to output a difference between the measured scanning time and the preset scanning time as said comparison result; and a phase data generating unit configured to generate phase data used for controlling the duration of the level of the pixel clock based on the comparison result, wherein the pixel clock generating unit generates the pixel clock based on the phase data, and the phase data generating unit comprises:

a correction value creation unit configured to create a correction value to be provided for the pixel clock based on the comparison result; and a phase data creation unit configured to create the phase data based on the sum of a plurality of said correction values created by the correction value creation unit.

11. The pixel clock generating device as claimed in claim 10, wherein the correction value creation unit includes a comparison result storage unit configured to store the comparison result, and the correction value creation unit creates a correction value based on the stored comparison result.

12. The pixel clock generating device as claimed in claim 11, wherein the correction value creation unit includes an integrator.

\* \* \* \* \*